(12) United States Patent
Gupta et al.

(10) Patent No.: US 12,676,901 B2
(45) Date of Patent: Jul. 7, 2026

(54) TECHNOLOGIES FOR CONFERENCE CALLS WITH PRIVACY CONTROL

(71) Applicant: Apple Inc., Cupertino, CA (US)

(72) Inventors: Vivek G. Gupta, San Jose, CA (US);
Farha Hameed, San Diego, CA (US);
Sanjay K. Verma, San Jose, CA (US);
Santosh Koraddi, Bengaluru (IN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/661,442

(22) Filed: May 10, 2024

(65) Prior Publication Data

US 2024/0380798 A1 Nov. 14, 2024

(30) Foreign Application Priority Data

May 11, 2023 (IN) .............................. 202311033346

(51) Int. Cl.
*H04L 65/1093* (2022.01)
*H04L 65/1016* (2022.01)
*H04L 65/1104* (2022.01)
*H04L 65/403* (2022.01)

(52) U.S. Cl.
CPC ........ *H04L 65/1093* (2013.01); *H04L 65/403* (2013.01); *H04L 65/1016* (2013.01); *H04L 65/1104* (2022.05)

(58) Field of Classification Search
CPC .............. H04L 65/1093; H04L 65/403; H04L 65/1104; H04L 65/1016
USPC ....................................................... 709/204
See application file for complete search history.

(56) References Cited

U.S. PATENT DOCUMENTS

| | | | | | |
|---|---|---|---|---|---|
| 2004/0071099 | A1* | 4/2004 | Costa-Requena | ........................... | H04L 12/1818 370/328 |
| 2005/0058125 | A1* | 3/2005 | Mutikainen | ......... | H04L 65/1016 370/354 |
| 2006/0034195 | A1* | 2/2006 | Blaiotta | .............. | H04L 65/4061 370/261 |
| 2007/0185957 | A1* | 8/2007 | Mandalia | .............. | H04L 65/401 709/204 |
| 2008/0155106 | A1* | 6/2008 | Hans | ........................ | H04M 3/56 709/227 |
| 2012/0296964 | A1* | 11/2012 | Chaturvedi | ............. | H04M 3/56 709/204 |

(Continued)

FOREIGN PATENT DOCUMENTS

| CN | 101345845 B | 1/2011 |
|---|---|---|
| CN | 102111603 B | 12/2012 |
| CN | 113645365 A | 11/2021 |

OTHER PUBLICATIONS

A. Hernandez, E. Vazquez, p. Capelastegui and F. Gonzalez, "Lightweight Conferencing Enabler for Multiparty Applications in the IMS," 2009 Third International Conference on Next Generation Mobile Applications, Services and Technologies, Cardiff, UK, 2009, pp. 9-14 (Year: 2009).*

(Continued)

*Primary Examiner* — Taylor A Elfervig
(74) *Attorney, Agent, or Firm* — Kilpatrick Townsend & Stockton LLP

(57) ABSTRACT

The present application relates to devices and components, including apparatus, systems, and methods for creating an Internet protocol multimedia subsystem (IMS) conference call with privacy controls.

16 Claims, 11 Drawing Sheets

(56)     References Cited

U.S. PATENT DOCUMENTS

2015/0172333 A1*   6/2015   Lindstrom ............ H04L 65/403
                                                                370/261
2015/0188727 A1*   7/2015   Bruner .................. H04L 65/403
                                                                370/329

OTHER PUBLICATIONS

R. Peterkin, F. El-Hassan and D. Ionescu, "A reconfigurable architecture for IP Multimedia Subsystem session setup, " 2010 International Joint Conference on Computational Cybernetics and Technical Informatics, Timisoara, Romania, 2010, pp. 637-642 (Year: 2010).*
J. Sim, T. H. Tieu and Y. Kim, "Conferencing service interworking between overlays and IMS networks," The International Conference on Information Networking 2011 (ICOIN2011), Kuala Lumpur, Malaysia, 2011, pp. 513-518, (Year: 2011).*
India Patent Application No. 202311033346, First Examination Report, Jan. 30, 2026, 15 pages.

\* cited by examiner

600

```
Update SIP 610

UPDATE UE-2
        To: UE-2
        From: UE-1
Allow-Events: conference
Content-Type: application/conference-info+xml Content-Disposition:
Conference-info
<?xml version="1.0" encoding="UTF-8"?>
<conference-info xmlns="urn:ietf:params:xml:ns:conference-info"
<conference-uri>
entity="Conference Factory URI"
</conference-uri> </conference-info>
```

```
Options SIP 620

OPTIONS UE-2
        To: UE-2
        From: UE-1
Allow-Events: conference
Content-Type: application/conference-info+xml Content-Disposition:
Conference-info
<?xml version="1.0" encoding="UTF-8"?>
<conference-info xmlns="urn:ietf:params:xml:ns:conference-info"
<conference-uri>
entity="Conference Factory URI"
</conference-uri> </conference-info>
```

```
Re-Invite SIP 630

INVITE UE-2
        To: UE-2
        From: UE-1
Allow-Events: conference
Content-Type: application/conference-info+xml Content-Disposition:
Conference-info
<?xml version="1.0" encoding="UTF-8"?>
<conference-info xmlns="urn:ietf:params:xml:ns:conference-info"
<conference-uri>
entity="Conference Factory URI"
</conference-uri> </conference-info>
```

FIG. 6

700
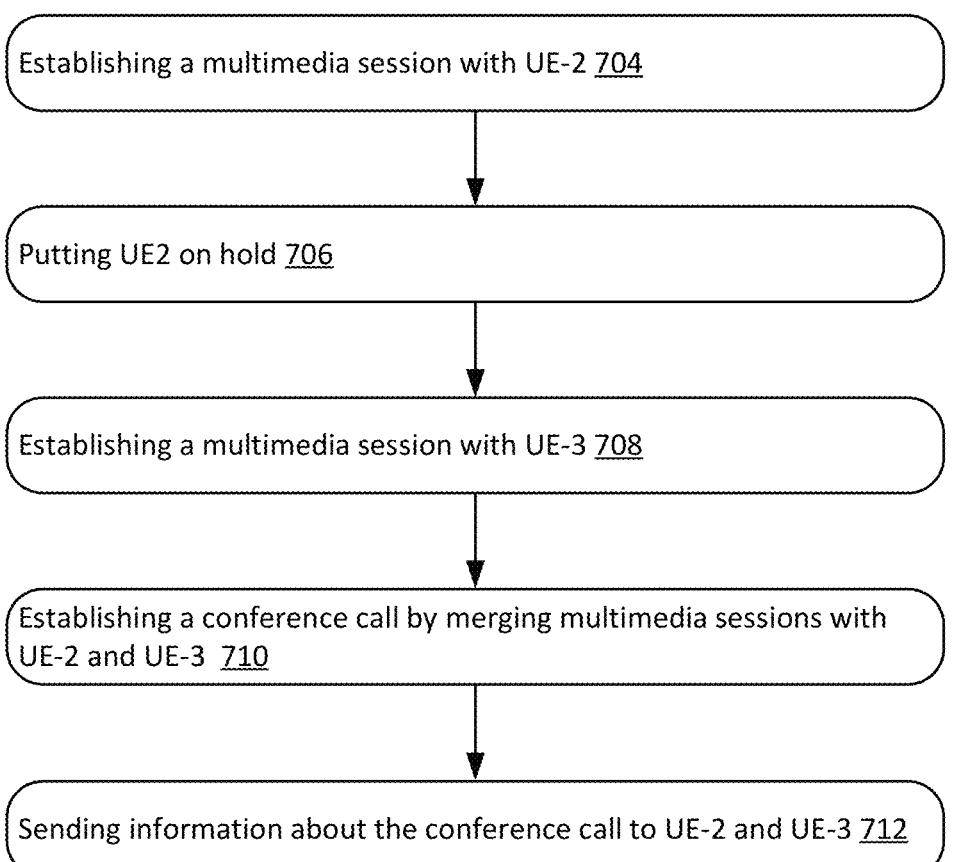
Establishing a multimedia session with UE-2 704
Putting UE2 on hold 706
Establishing a multimedia session with UE-3 708
Establishing a conference call by merging multimedia sessions with UE-2 and UE-3 710
Sending information about the conference call to UE-2 and UE-3 712
FIG. 7

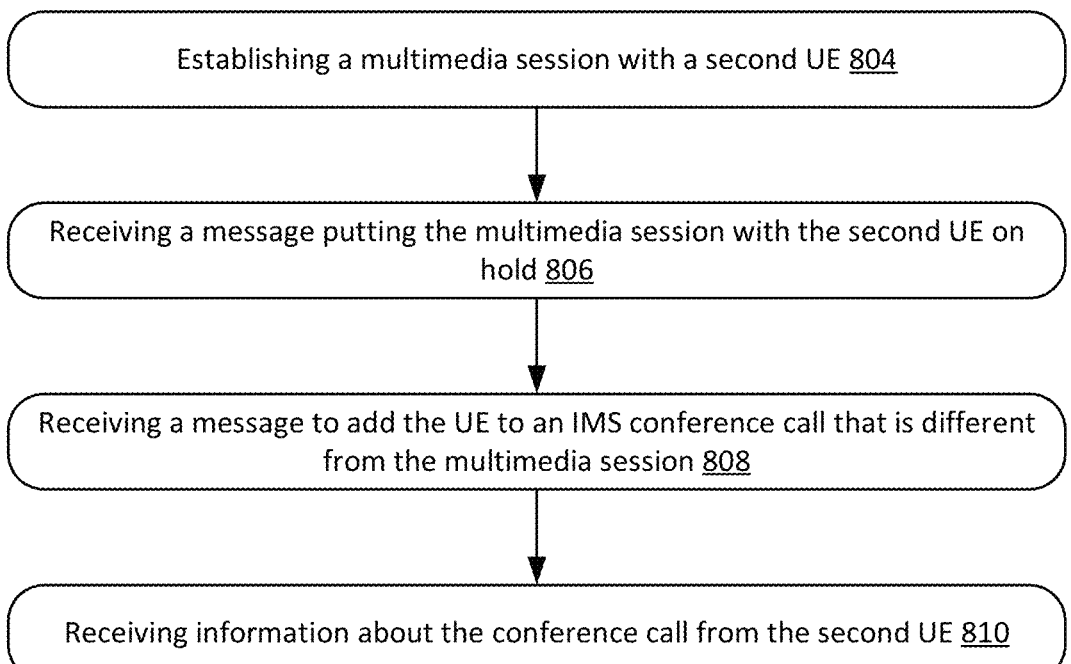
FIG. 8

900

Receiving a request from UE-1 to start a conference call 904

Establishing the conference call with UE-1, UE-2, and UE-3 906

Receiving a subscribe message from UE-2 908

Sending a notification to UE-2 910

Receiving a subscribe message from UE-3 912

Sending a notification to UE-3 914

TECHNOLOGIES FOR CONFERENCE CALLS WITH PRIVACY CONTROL

CROSS-REFERENCE TO RELATED APPLICATION

This patent application is a U.S. Non-Provisional Patent Application of India Patent Application No. 202311033346, filed on May 11, 2023, entitled "TECHNOLOGIES FOR CONFERENCE CALLS WITH PRIVACY CONTROL," hereby incorporated by reference in its entirety and for all purposes.

TECHNICAL FIELD

This application generally relates to cellular communication networks and, in particular, to technologies for conference calls.

BACKGROUND

Internet protocol (IP) Multimedia Subsystem (IMS) is a network architecture that integrates with the wireless mobile core network to enable IP-based real-time services, such as traditional voice calls and text messages (short message service or SMS). IMS may be used for voice calls through voice-over long-term evolution (VOLTE) or voice-over new radio (VoNR).

BRIEF DESCRIPTION OF THE DRAWINGS

FIG. 6 illustrates signaling messages in accordance with some embodiments.

FIG. 7 illustrates an operational flow/algorithmic structure in accordance with some embodiments.

FIG. 8 illustrates an operational flow/algorithmic structure in accordance with some embodiments.

DETAILED DESCRIPTION

Figure 1:
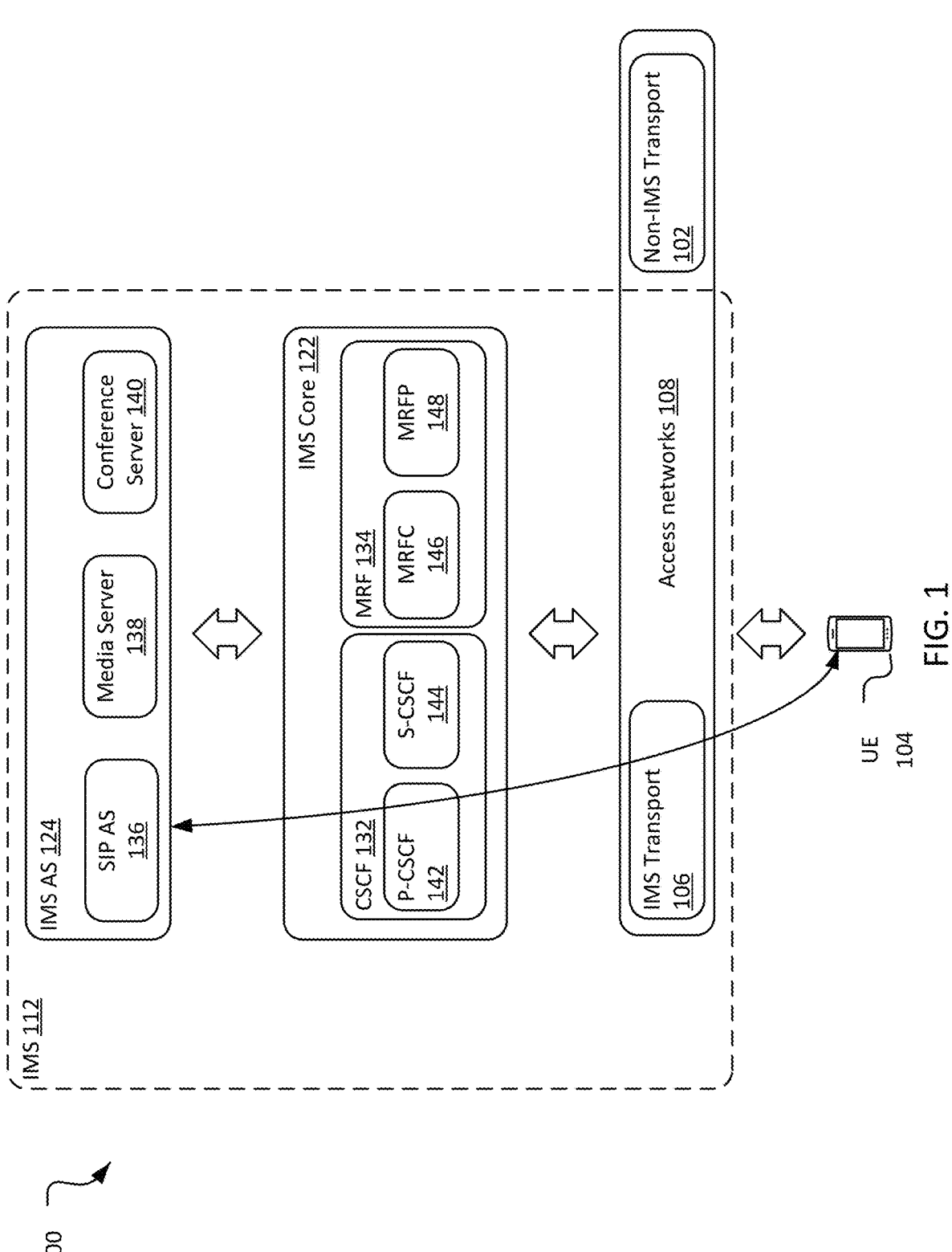
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, and/or techniques, in order to provide a thorough understanding of the various aspects of some embodiments. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B), and the phrase "based on A" means "based at least in part on A," for example, it could be "based solely on A," or it could be "based in part on A."

The following is a glossary of terms that may be used in this disclosure.

The term "circuitry" as used herein refers to, is part of, or includes hardware components, such as an electronic circuit, a logic circuit, a processor (shared, dedicated, or group), or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), and/or digital signal processors (DSPs), that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations; or recording, storing, or transferring digital data. The term "processor circuitry" may refer to an application processor; baseband processor; a central processing unit (CPU); a graphics processing unit; a single-core processor; a dual-core processor; a triple-core processor; a quad-core processor; or any other device capable of executing or otherwise operating computer-executable instructions, such as program code; software modules; or functional processes.

The term "interface circuitry," as used herein, refers to, is part of, or includes circuitry that enables the exchange of information between two or more components or devices. The term "interface circuitry" may refer to one or more hardware interfaces; for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device, including a wireless communications interface.

The term "computer system," as used herein, refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to a computer, storage, or network resources provided by physical hardware element(s). A "virtualized resource" may refer to a computer, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects, or services accessible through a server where such system resources reside on a single host or multiple hosts and are clearly identifiable.

The term "channel," as used herein, refers to any tangible or intangible transmission medium used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link," as used herein, refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during the execution of program code.

The term "connected" may mean that two or more elements at a common communication protocol layer have an established signaling relationship with one another over a communication channel, link, interface, or reference point.

The term "network element," as used herein, refers to physical or virtualized equipment or infrastructure used to provide wired or wireless communication network services. The term "network element" may be considered synonymous with or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

FIG. 1 illustrates a network environment 100 in accordance with some embodiments. The network environment 100 may include a UE 104, access networks (AN) 108, and IMS 112.

The AN 108 may include IMS transport 106 and non-IMS transport 102. The IMS transport 106 may provide the UE 104 with wireless access through the IMS 112. The non-IMS transport 102 may provide the UE 104 with wireless access through core 3GPP networks. The AN 108 may be compatible with various generations of 3GPP TSs. For example, the AN 108 may include an evolved universal terrestrial radio access network (E-UTRAN) or a next-generation radio access network (NG-RAN). In one embodiment, the control plane of a multimedia session is provided by the IMS 112, and the data plane is provided by the non-IMS transport 102.

In some embodiments, the AN 108 is a next-generation node B (gNB) that provides one or more 3GPP New Radio (NR) cells. In other embodiments, the AN 108 is an evolved node B (eNB) that provides one or more Long Term Evolution (LTE) cells. The air interface over which the UE 104 and the AN 108 communicate may be compatible with 3GPP technical specifications (TSs), such as those that define Fifth Generation (5G) NR or later system standards (e.g., Sixth Generation (6G) standards).

The UE 104 may set up a multimedia session with a second UE using IMS. The UE 104 and the second UE may communicate with one another and the network components through a session initiation protocol (SIP) signaling to establish the multimedia session. SIP may be used to initiate, maintain, modify, and terminate real-time communication sessions that include multimedia applications such as voice, video, and messaging.

The IMS transport 106 may provide the UE 104 access to the IMS core 122. The IMS core 122 may include a call session control function (CSCF) 132 or a media resource function (MRF) 134. The CSCF 132 may be a logical entity associated with a UE. For example, the UE 104 may be associated with an instance of a CSCF, e.g., CSCF 132. The CSCF 132 provides the UE 104 with CSCFs associated with other UEs or the IMS application server (AS) 124.

The CSCF 132 may include a proxy CSCF (P-CSCF) 142, a serving CSCF (S-CSCF) 144, or an interrogating CSCF (I-CSCF), not depicted in FIG. 1. The P-CSCF 142 may receive and rout the SIP messages to and from the UE 104. The P-CSCF 142 may update the S-CSCF 144. The S-CSCF 144 may be located in the home network and is coupled with the home subscriber server (HSS) to access user profiles.

The CSCF 132 may be used to process SIP signaling packets in the IMS. The P-CSCF 142 is a SIP proxy that is the first point of contact for the IMS terminal. It can be located either in the visited network (in full IMS networks) or in the home network (when the visited network is not IMS compliant). Some networks may use a session border controller (SBC). The P-CSCF is, at its core, a specialized SBC for the user-network interface, which protects the network and the IMS terminal. The UE 104 may discover its P-CSCF with dynamic host configuration protocol (DHCP), or the UE 104 may be configured (e.g., during initial provisioning or via a 3GPP IMS management object (MO)) in the IP multimedia services identity module (ISIM), or assigned in the packet data protocol (PDP) context or in general packet radio service (GPRS).

The SIP application server (AS) or the IMS AS 124 provides application servers to support a multimedia session. The IMS AS 124 may host and execute services and interface with the S-CSCF using SIP. An example of an AS in 3GPP is the voice call continuity function (VCC server). Depending on the service, the AS 124 may operate in SIP proxy mode, SIP user agent (UA) mode, or SIP back-to-back user agent (B2BUA) mode. The AS 124 may be located in the home network or in an external third-party network. The AS 124 located in the home network may query the HSS.

The IMS AS 124 may be implemented in IMS Core 122. The IMS AS 124 may include a SIP AS 136 for managing the SIP message traffic or a media server 138. For example, the SIP AS 136 may be implemented in CSCF 132, or media server 138 may be part of the MRF 134.

The MRF 134 provides media-related functions such as media manipulation (e.g., voice stream mixing) and the playing of tones and announcements. The MRF 134 may include a media resource function controller (MRFC) 146 or a media resource function processor (MRFP) 148. The MRFC 146 may interpret information from the IMS AS 124 or S-CSCF 144 to control the MRFP 148. The MRFP 148 may be used to mix, source, or process media streams or to manage access rights to shared resources.

In one embodiment, the UE 104 may communicate with a first UE in a multimedia session. The UE 104 may merge the multimedia session with the first UE with a multimedia session between the UE 104 and a second UE to form a conference call. A conference server 140 may enable multimedia communication services for a conference call. For example, conference server 140 may provide high-definition video conference (HDVC) service for point-to-point video calls and video conferences with a full duplex audio stream. In some instances, the functions of the conference server 140 may be performed by the MRFC 146 or the IMS AS 124. A conference server performed by MRFC may be denoted by AS/MRFC, MRFC-AS, or MRFC/AS.

In some instances, in the context of IMS, an event refers to a specific occurrence or status. UEs or other network nodes may subscribe to an event. When a UE subscribes to an event, it may receive notifications related to it. For example, an event may be associated with a conference call. A UE subscribed to a conference call event may receive notifications related to that conference call.

In legacy systems, the non-initiator UEs of a conference call do not subscribe to the conference event. Therefore, the non-initiator UEs may not have conference event details, e.g., the IP address of the conference server or the participating UEs. As a result, when a new non-initiator UE is added to the IMS conference call, the new user may not be notified about being added to the conference call and may not have information about the existing participants in the conference call. The new non-initiator UE may be added to a conference call without being informed, and the data from the new user may be received by the existing participants on the conference call, compromising the new user's privacy.

Similarly, when a new user is added or an existing user leaves a conference call, the other non-initiator users are not notified about the updated active participants in the conference call. As a result, the existing users may not know the identity of new users being added, thus compromising their privacy.

In one embodiment, once the conference call is established, the initiator UE may provide the non-initiator UEs with information for subscribing to the conference event. The non-initiator UEs may subscribe to the conference event and receive information related to the conference event, such as the participant list.

Figure 2:
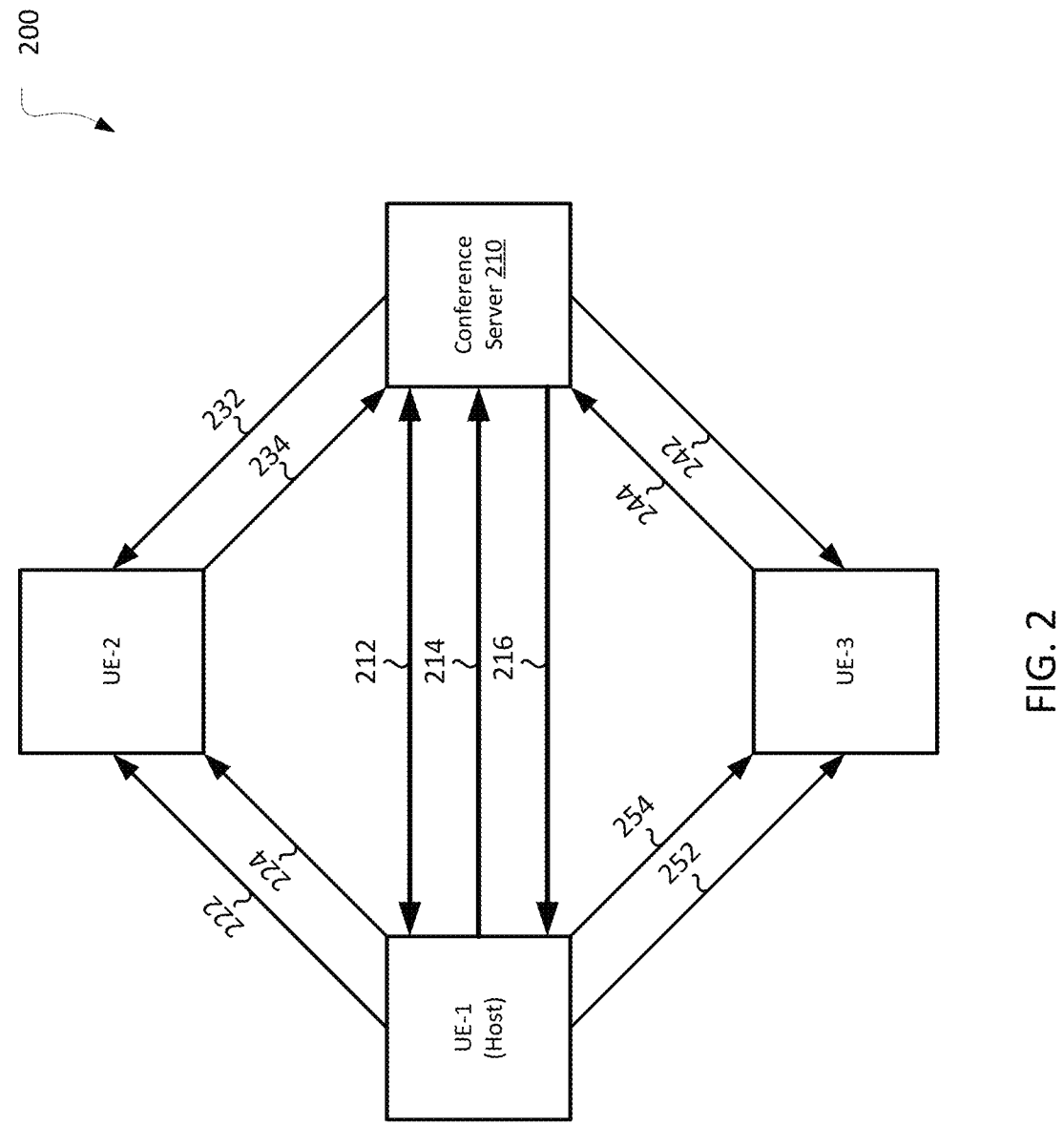
FIG. 2 illustrates a signaling diagram in accordance with some embodiments.

FIG. 2 illustrates a signaling diagram 200 in accordance with some embodiments. Signaling diagram 200 is an example of messages involved in establishing a conference call with privacy controls for three UEs. Consider that UE-1 and UE-2 are in an IMS call, e.g., a multimedia session. The UE-1 puts UE-2 on hold. While UE-2 is on hold, UE-1 and UE-3 establish an IMS call, e.g., a multimedia session. UE-1 adds UE-2 and UE-3 to a conference call by merging the multimedia session between UE1 and UE-2 and the multimedia session between UE1 and UE-3.

UE-1 may set up a conference call server 210. A collection of signaling 212 between UE-1 and the conference server 210 may set up the conference server 210. For example, UE-1 may use a conference-factory uniform resource identifier (URI) to set up the conference call server 210. When UE-1 initiates the conference call, UE-1 may be referred to as the host or initiator UE, and the conference server 210 is associated with UE-1. The initiator UE, UE-1, may use URI to initiate a conference call with the MRFC-AS. The MRFC-AS may assign a conference URI to the conference call and configure the MRFP.

Once the conference call and conference call server 210 are established, UE-1 may add UE-2 and UE-3 to the conference call. UE-1 may send a refer message 222 to UE-2 to add UE-2 to the conference call. For example, UE-1 may send a SIP REFER message to UE-2 to add UE-2 to the conference call. REFER is a method of SIP that may be used to establish and control multimedia sessions with two or more participants. REFER method may request the recipient (the referee) to contact a third party using the contact information provided in the request. UE-1 (the referrer) may send a REFER to UE-2 requesting to contact the conference call URI.

UE-1 may subscribe to the conference event, e.g., the event associated with the conference call. When subscribed to the conference event, UE-1 may receive event notification. UE-1 may subscribe to the conference event by sending a subscribe message 214 to the conference server 210. For example, UE-1 may send a SUBSCRIBE method to the conference server 210 to subscribe to the conference event. In response to the subscribe message 214, the conference server 210 may send a notification message 216 to UE-1 with information about the conference event. For example, the conference server 210, in response to the SIP SUBSCRIBE method, may send a SIP NOTIFY method to inform UE-1 about the conference event. The SIP NOTIFY method may include participant list information.

In one embodiment, UE-1 may send an update message 224 to UE-2 to provide information about the conference server. For example, UE-1 may send SIP UPDATE, SIP OPTIONS, or SIP RE-INVITE to UE-2 to provide the conference server URI or conference event to UE-2. UE-1 may configure UPDATE, OPTION, or RE-INVITE messages with the header "Allow-Events: conference" and extensible markup language (XML) body containing the conference URI. UE-2 may send a success message to respond to the update message 224, indicating that the request was successful. For example, UE-2 may send a SIP 200 OK response for SIP UPDATE, OPTION, or RE-INVITE messages. UE-1 may further acknowledge receipt of the success message from UE-2. For example, in response to receiving a SIP 200 OK from UE-2, UE-1 may send a SIP ACK message to UE-2. SIP ACK method may be used to acknowledge the receipt of a response to a request, e.g., an INVITE request.

Receiving the information of the conference server from UE-1, UE-2 may subscribe to the conference event. When subscribed to the conference event, UE-2 may receive event notification. UE-2 may subscribe to the conference event by sending a subscribe message 234 to the conference server 210. For example, UE-2 may send a SUBSCRIBE method to the conference server 210 to subscribe to the conference event. In response to the subscribe message 234, the conference server 210 may send a notification message 232 to UE-2 with information about the conference event. For example, the conference server 210, in response to the SIP SUBSCRIBE method, may send a SIP NOTIFY method to inform UE-2 about the conference event. The SIP NOTIFY method may include participant list information.

UE-1 may send an update message 254 to UE-3 to provide information about the conference server. For example, UE-1 may send SIP UPDATE, SIP OPTIONS, or SIP RE-INVITE to UE-3 to provide the conference server URI or conference event to UE-3. UE-1 may configure UPDATE, OPTION, or RE-INVITE messages with the header "Allow-Events: conference" and extensible markup language (XML) body containing the conference URI. UE-3 may send a success message to respond to the update message 254, indicating that the request was successful. For example, UE-3 may send a SIP 200 OK response for SIP UPDATE, OPTION, or RE-INVITE messages. UE-1 may further acknowledge receipt of the success message from UE-3. For example, in response to receiving a SIP 200 OK from UE-3, UE-1 may send a SIP ACK message to UE-3. SIP ACK method may be used to acknowledge the receipt of a response to a request, e.g., an INVITE request.

Receiving the information of the conference server from UE-1, UE-3 may subscribe to the conference event. When subscribed to the conference event, UE-2 may receive event notification. UE-2 may subscribe to the conference event by sending a subscribe message 244 to the conference server 210. For example, UE-3 may send a SUBSCRIBE method to the conference server 210 to subscribe to the conference event. In response to the subscribe message 244, the conference server 210 may send a notification message 242 to UE-3 with information about the conference event. For example, the conference server 210, in response to the SIP SUBSCRIBE method, may send a SIP NOTIFY method to inform UE-3 about the conference event. The SIP NOTIFY method may include participant list information.

The order of signaling described above is intended to describe the procedure by way of an example and is not intended to be a limitation. For example, UE-1, UE-2, and UE-3 may send the abovementioned messages in different orders.

Figure 3:
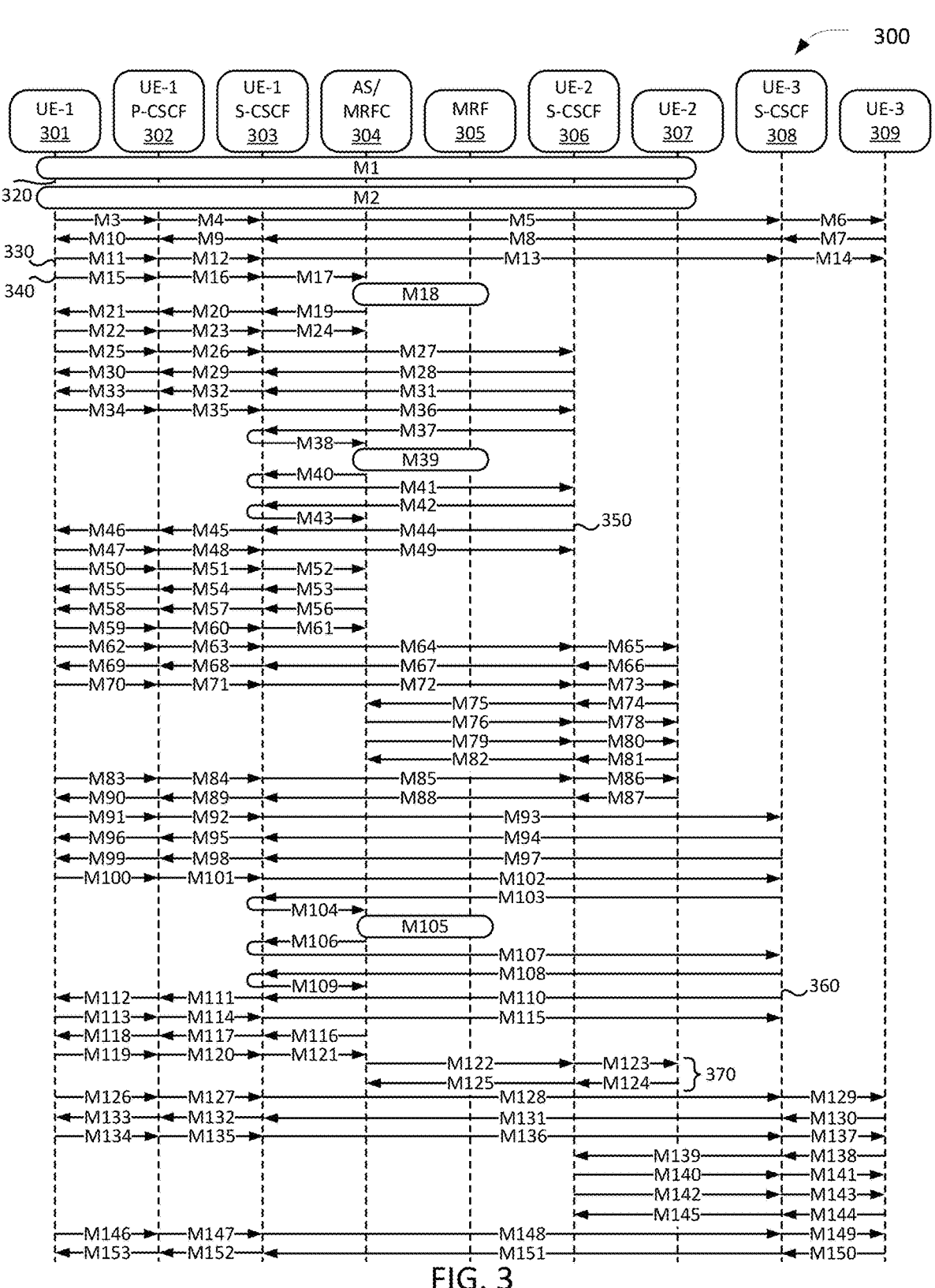
FIG. 3 illustrates a signaling diagram in accordance with some embodiments.

FIG. 3 illustrates a signaling diagram 300 in accordance with some embodiments. Signaling diagram 300 is an example of messages involved in establishing a conference call with privacy controls for three UEs.

The group of messages in M1 may establish a multimedia session for UE-1 301 and UE-2 307. As a result, at 320, a media path from UE-1 301 to UE2 307 is configured.

The group of messages in M2 puts UE-2 307 on hold before invoking the 3-way calling with UE-3 309.

Messages M3-M14 may establish a call with UE-3 309 following the normal call setup procedure and get UE-3's permission to start the 3-way calling. UE-1 301 may establish a call with UE-3 309 by sending a SIP INVITE message to UE-3 309. M3-M6 may carry the SIP INVITE message from UE-1 301 to UE-3 309, where the message is being forwarded through different network nodes. UE-1 may send M3 to UE-1 P-CSCF 302, e.g., the P-CSCF associated with the UE-1. M3 may be the SIP INVITE message. UE-1 P-CSCF 302 may send the SIP INVITE message in M4 to UE-1 S-CSCF 303. UE-1 S-CSCF may be the S-CSCF associated with UE-1 301. M5 may be the SIP INVITE message. UE-1 S-CSCF 303 may send the SIP INVITE message in M5 to UE-3 S-CSCF 308. UE-3 S-CSCF 308 may be the S-CSCF associated with UE-3 309. M6 may be the SIP INVITE message. UE-3 S-CSCF 308 may send the SIP INVITE message in M6 to UE-3 309.

UE-3 309 may send a success message to UE-1 301. For example, UE-3 309 may send a SIP 200 OK response to UE-1 301. M7-M10 may carry the UE-3 309 SIP 200 OK message to UE-1 301 through the network nodes. UE-3 309 may send M7 to UE-3 S-CSCF 308. UE-3 S-CSCF 308 may send M8 to UE-1 S-CSCF 303. UE-1 S-CSCF 303 may send M9 to UE-1 P-CSCF 302, and UE-1 P-CSCF 302 may send M10 to UE-1 301.

UE-1 301 may send an acknowledgment message to UE-3 309. For example, UE-1 301 may send a SIP ACK message to UE-3 309. M11-M14 may carry the UE-1 301 SIP ACK message to UE-3 309. UE-1 may send M11 to UE-1 P-CSCF 302. UE-1 P-CSCF 302 may send M12 to UE-1 S-CSCF 303. UE-1 S-CSCF 303 may send M13 to UE-3 S-CSCF 308, and UE-3 S-CSCF 308 may send the M14 to UE-3 309.

At 330, a media path between UE-1 301 and UE-3 309 is established. At 340, UE-1 301 may initiate establishing a conference call by merging multimedia sessions with UE-2 307 and UE-3 309.

UE-1 301 initiate creating the conference call and configuring the conference server. UE-1 301 may send an invite message to AS/MRFC 304. For example, UE-1 301 may send a SIP INVITE message to AS/MRFC 304. M15-M17 may carry the UE-1 301 SIP INVITE message to AS/MRFC 304. UE-1 301 may send M15 to UE-1 P-CSCF 302, UE-1 P-CSCF 302 may send M16 to UE-1 S-CSCF 303, and UE-1 S-CSCF 303 may send M17 to AS/MRFC 304. The remaining procedures and signaling for creating the conference are abstracted in signaling group M18.

With M19-M21, the conference server (CS) may send a 200 OK response and receive an ACK request from UE-1.

AS/MRFC 304 may send a success message to UE-1 301. For example, AS/MRFC 304 may send a SIP 200 OK response to UE-1 301. M19-M21 may carry the AS/MRFC 304 SIP 200 OK message to UE-1 301 through the network nodes. AS/MRFC 304 may send M19 to UE-1 S-CSCF 303. UE-1 S-CSCF 303 may send M20 to UE-1 P-CSCF 302, and UE-1 P-CSCF 302 may send M21 to UE-1 301.

UE-1 301 may send an acknowledgment message to AS/MRFC 304. For example, UE-1 301 may send a SIP ACK message to AS/MRFC 304. M22-M24 may carry the UE-1 301 SIP ACK message to AS/MRFC 304. UE-1 may send M22 to UE-1 P-CSCF 302. UE-1 P-CSCF 302 may send M23 to UE-1 S-CSCF 303, and UE-1 S-CSCF 303 may send M24 to AS/MRFC 304.

With M25-30, UE-1 301 may send a SIP REFER request to UE-2 307 with the Refer-To header set to the address of the CS, e.g., CS URI, and UE-2 307 accepts the REFER request.

UE-1 301 may send a refer message to UE-2 307. For example, UE-1 301 may send a SIP REFER message to UE-2 307. M25-M27 may carry the UE-1 301 SIP REFER message to UE-2 307. UE-1 may send M25 to UE-1 P-CSCF 302. UE-1 P-CSCF 302 may send M26 to UE-1 S-CSCF 303, and UE-1 S-CSCF 303 may send M27 to UE-2 S-CSCF 306.

UE-2 307 may send a success message to UE-1 301. For example, UE-2 307 may send a SIP 200 OK response to UE-1 301. M28-M30 may carry the UE-2 307 SIP 200 OK message to UE-1 301 through the network nodes. UE-2 S-CSCF 306 may send M28 to UE-1 S-CSCF 303. UE-1 S-CSCF 303 may send M29 to UE-1 P-CSCF 302, and UE-1 P-CSCF 302 may send M30 to UE-1 301.

With M31-36, UE-2 307 may send a SIP NOTIFY request to UE-1 301 to indicate that UE-2 307 is acting on the REFER request.

UE-2 307 may send a notification message to UE-1 301. For example, UE-2 307 may send a SIP NOTIFY with a 100 TRYING response to UE-1 301. M31-M33 may carry the UE-2 307 SIP NOTIFY with 100 TRYING response message to UE-1 301 through the network nodes. UE-2 S-CSCF 306 may send M31 to UE-1 S-CSCF 303. UE-1 S-CSCF 303 may send M32 to UE-1 P-CSCF 302, and UE-1 P-CSCF 302 may send M33 to UE-1 301.

UE-1 301 may send a success message to UE-2 307. For example, UE-1 301 may send a SIP 200 OK response to UE-2 307. M34-M36 may carry the UE-1 301 SIP 200 OK message to UE-2 307 through the network nodes. UE-1 301 may send M34 to UE-1 P-CSCF 302. UE-1 P-CSCF 302 may send M35 to UE-1 S-CSCF 303, and UE-1 S-CSCF 303 may send M36 to UE-2 S-CSCF 306.

With M37-38, UE-2 307 may send an INVITE request to the CS, e.g., AS/MRFC 304, to join the conference call.

UE-2 307 may send an invite message to AS/MRFC 304 to join the conference call. For example, UE-2 307 may send a SIP INVITE message to AS/MRFC 304. M37-38 may carry the UE-2 307 SIP INVITE message to AS/MRFC 304. UE-2 S-CSCF 306 may send M37 to UE-1 S-CSCF 303, and UE-1 S-CSCF 303 may send M38 to AS/MRFC 304.

With group message M39, the AS/MRFC 304 coordinates with MRF to allocate more resources.

With M40-43, the AS/MRFC 304 may send a 200 OK response to UE-2 307 and receive an ACK request.

AS/MRFC 304 may send a success message to UE-2 307. For example, AS/MRFC 304 may send a SIP 200 OK response to UE-2 307. M40-M41 may carry the AS/MRFC 304 SIP 200 OK message to UE-2 307 through the network nodes. AS/MRFC 304 may send M40 to UE-1 S-CSCF 303. UE-1 S-CSCF 303 may send M41 to UE-2 S-CSCF 306.

UE-2 307 may send an acknowledgment message to AS/MRFC 304. For example, UE-2 307 may send a SIP ACK request message to AS/MRFC 304. M42-43 may carry the UE-2 307 SIP ACK request message to AS/MRFC 304. UE-2 S-CSCF 306 may send M42 to UE-1 S-CSCF 303, and UE-1 S-CSCF 303 may send M43 to AS/MRFC 304.

At 350, a media path between UE-2 307 and MRF 305 is established.

With M44-49, UE-2 307 may send a NOTIFY request to UE-1 301 to indicate that it has finished the action required by the REFER request.

UE-2 307 may send a notification message to UE-1 301. For example, UE-2 307 may send a SIP NOTIFY message to UE-1 301. M44-M46 may carry the UE-2 307 SIP NOTIFY message to UE-1 301 through the network nodes. UE-2 S-CSCF 306 may send M44 to UE-1 S-CSCF 303. UE-1 S-CSCF 303 may send M45 to UE-1 P-CSCF 302, and UE-1 P-CSCF 302 may send M46 to UE-1 301.

UE-1 301 may send a success message to UE-2 307. For example, UE-1 301 may send a SIP 200 OK response to UE-2 307. M47-M49 may carry the UE-1 301 SIP 200 OK message to UE-2 307 through the network nodes. UE-1 301 may send M47 to UE-1 P-CSCF 302. UE-1 P-CSCF 302 may send M48 to UE-1 S-CSCF 303, and UE-1 S-CSCF 303 may send M49 to UE-2 S-CSCF 306.

With M50-52 UE-1 301 subscribing to conference event by sending a SIP SUBSCRIBE message to AS/MRFC 304.

UE-1 301 may send a subscribe message to AS/MRFC 304. For example, UE-1 301 may send a SIP SUBSCRIBE message to AS/MRFC 304. M50-M52 may carry the UE-1 301 SIP SUBSCRIBE message to AS/MRFC 304. UE-1 301 may send M50 to UE-1 P-CSCF 302. UE-1 P-CSCF 302 may send M51 to UE-1 S-CSCF 303, and UE-1 S-CSCF 303 may send M52 to AS/MRFC 304.

With M53-55, the CS, e.g., AS/MRFC 304 (the CS may include both AS/MRFC 304 and MRF 305), may send a 200 OK response to UE-1 301.

AS/MRFC 304 may send a success message to UE-1 301. For example, AS/MRFC 304 may send a SIP 200 OK response to UE-1 301. M53-M55 may carry the AS/MRFC 304 SIP 200 OK message to UE-1 301 through the network nodes. AS/MRFC 304 may send M53 to UE-1 S-CSCF 303. UE-1 S-CSCF 303 may send M54 to UE-1 P-CSCF 302, and UE-1 P-CSCF 302 may send M55 to UE-1 301.

With M56-58, the CS, e.g., AS/MRFC 304, may send a SIP NOTIFY with the participant list to UE-1 301. The participant list may include information related to the UEs connected to the conference call, such as identification information.

AS/MRFC 304 may send a notification message with the participant list to UE-1 301. For example, AS/MRFC 304 may send a SIP NOTIFY message to UE-1 301. M56-M58 may carry the AS/MRFC 304 SIP NOTIFY message with the participant list to UE-1 301 through the network nodes. AS/MRFC 304 may send M56 to UE-1 S-CSCF 303. UE-1 S-CSCF 303 may send M57 to UE-1 P-CSCF 302, and UE-1 P-CSCF 302 may send M58 to UE-1 301.

With M59-61, the UE-1 301 may send a 200 OK response to CS.

UE-1 301 may send a success message to AS/MRFC 304. For example, UE-1 301 may send a SIP 200 OK response to AS/MRFC 304. M59-M61 may carry the UE-1 301 SIP 200 OK response to AS/MRFC 304. UE-1 may send M59 to UE-1 P-CSCF 302. UE-1 P-CSCF 302 may send M60 to UE-1 S-CSCF 303, and UE-1 S-CSCF 303 may send M61 to AS/MRFC 304.

In one embodiment, with M62-65, UE-1 301 may send a SIP UPDATE, OPTIONS, or RE-INVITE message with the header "Allow-Event: conference" and XML body containing the conference URI information to UE-2 307.

UE-1 301 may send an update message to UE-2 307. For example, UE-1 301 may send a SIP UPDATE, OPTIONS, or RE-INVITE message with the header "Allow-Event: conference" and XML body containing the conference URI information to UE-2 307. M62-M65 may carry the UE-1 301 SIP UPDATE, OPTIONS, or RE-INVITE message with the header "Allow-Event: conference" and XML body containing the conference URI information to UE-2 307 through the network nodes. UE-1 301 may send M62 to UE-1 P-CSCF 302. UE-1 P-CSCF 302 may send M63 to UE-1 S-CSCF 303. UE-1 S-CSCF 303 may send M64 to UE-2 S-CSCF 306, and UE-2 S-CSCF 306 may send M65 to UE-2 307.

In one embodiment, with M66-73, UE-2 307 may send a SIP 200 OK response to UE-1 301 and receive an ACK request.

UE-2 307 may send a success message to UE-1 301. For example, UE-2 307 may send a SIP 200 OK response to UE-1 301. M66-M69 may carry the UE-2 307 SIP 200 OK response to UE-1 301 through the network nodes. UE-2 may send M66 to UE-2 S-CSCF 306. UE-2 S-CSCF 306 may send M67 to UE-1 S-CSCF 303. UE-1 S-CSCF 303 may send M68 to UE-1 P-CSCF 302, and UE-1 P-CSCF 302 may send M69 to UE-1 301.

UE-1 301 may send an acknowledgment message to UE-2 307. For example, UE-1 301 may send a SIP ACK request message to UE-2 307. M70-M73 may carry the UE-1 301 SIP ACK request message to UE-2 307 through the network nodes. UE-1 301 may send M70 to UE-1 P-CSCF 302. UE-1 P-CSCF 302 may send M71 to UE-1 S-CSCF 303. UE-1 S-CSCF 303 may send M72 to UE-2 S-CSCF 306, and UE-2 S-CSCF 306 may send M73 to UE-2 307.

In one embodiment, with M74-75, UE-2 307 may subscribe for conference event by sending a SIP SUBSCRIBE to CS.

UE-2 307 may send a subscribe message to AS/MRFC 304. For example, UE-2 307 may send a SIP SUBSCRIBE message to UE-1 301. M74-M75 may carry the UE-2 307 SIP SUBSCRIBE message to AS/MRFC 304 through the network nodes. UE-2 may send M74 to UE-2 S-CSCF 306, and UE-2 S-CSCF 306 may send M74 to AS/MRFC 304.

In one embodiment, with M76-78, the CS may send a 200 OK response to UE-2 307.

AS/MRFC 304 may send a success message to UE-2 307. For example, AS/MRFC 304 may send a SIP 200 OK response to UE-2 307. M76-M78 may carry the AS/MRFC 304 SIP 200 OK response to UE-2 307 through the network nodes. AS/MRFC 304 may send M76 to UE-2 S-CSCF 306, and UE-2 S-CSCF 306 may send M78 to UE-2 307.

In one embodiment, with M79-80, the CS may send a NOTIFY with participants to UE-2 307.

AS/MRFC 304 may send a notification message with the participant list to UE-2 307. For example, AS/MRFC 304 may send a SIP NOTIFY message with the participant list to UE-2 307. M76-M78 may carry the AS/MRFC 304 SIP NOTIFY message with the participant list to UE-2 307 through the network nodes. AS/MRFC 304 may send M79 to UE-2 S-CSCF 306, and UE-2 S-CSCF 306 may send M80 to UE-2 307.

In one embodiment, with M81-82, UE-2 307 may send a 200 OK response to CS.

UE-2 307 may send a success message to AS/MRFC 304. For example, UE-2 307 may send a SIP 200 OK response to UE-1 301. M74-M75 may carry the UE-2 307 SIP SIP 200 OK response to AS/MRFC 304 through the network nodes. UE-2 may send M81 to UE-2 S-CSCF 306, and UE-2 S-CSCF 306 may send M82 to AS/MRFC 304.

With M83-90 UE-1, a BYE request may be sent to terminate the multimedia session between itself and UE-2 307.

UE-1 301 may send a termination message to UE-2 307. For example, UE-1 301 may send a SIP BYE request message to UE-2 307. M83-M86 may carry the UE-1 301 SIP BYE request message to UE-2 307 through the network nodes. UE-1 301 may send M83 to UE-1 P-CSCF 302. UE-1 P-CSCF 302 may send M84 to UE-1 S-CSCF 303. UE-1 S-CSCF 303 may send M85 to UE-2 S-CSCF 306, and UE-2 S-CSCF 306 may send M86 to UE-2 307.

UE-2 307 may send a success message to UE-1 301. For example, UE-2 307 may send a SIP 200 OK response to UE-1 301. M87-M90 may carry the UE-2 307 SIP 200 OK response to UE-1 301 through the network nodes. UE-2 may send M87 to UE-2 S-CSCF 306. UE-2 S-CSCF 306 may send M88 to UE-1 S-CSCF 303. UE-1 S-CSCF 303 may send M89 to UE-1 P-CSCF 302, and UE-1 P-CSCF 302 may send M90 to UE-1 301.

With M91-96, parallel to steps 25-90, UE-1 may send a REFER request to UE-3 309 with the "Refer-To" header set to the address of the CS. UE-3 309 may accept the REFER request.

UE-1 301 may send a refer message to UE-3 309. For example, UE-1 301 may send a SIP REFER message to UE-3 309. M91-M93 may carry the UE-1 301 SIP REFER message to UE-3 309. UE-1 may send M91 to UE-1 P-CSCF 302. UE-1 P-CSCF 302 may send M92 to UE-1 S-CSCF 303, and UE-1 S-CSCF 303 may send M93 to UE-3 S-CSCF 308.

UE-3 309 may send a success message to UE-1 301. For example, UE-3 309 may send a SIP 200 OK response to UE-1 301. M94-M96 may carry the UE-3 309 SIP 200 OK message to UE-1 301 through the network nodes. UE-3 S-CSCF 308 may send M94 to UE-1 S-CSCF 303. UE-1 S-CSCF 303 may send M95 to UE-1 P-CSCF 302, and UE-1 P-CSCF 302 may send M96 to UE-1 301.

With M97-102, UE-3 309 may send a SIP NOTIFY request to UE-1 301 to indicate that UE-2 307 is acting on the REFER request.

UE-3 309 may send a notification message to UE-1 301. For example, UE-3 309 may send a SIP NOTIFY with a 100 TRYING response to UE-1 301. M97-M99 may carry the UE-3 309 SIP NOTIFY with 100 TRYING response messages to UE-1 301 through the network nodes. UE-3 S-CSCF 308 may send M97 to UE-1 S-CSCF 303. UE-1 S-CSCF 303 may send M98 to UE-1 P-CSCF 302, and UE-1 P-CSCF 302 may send M99 to UE-1 301.

UE-1 301 may send a success message to UE-3 309. For example, UE-1 301 may send a SIP 200 OK response to UE-3 309. M100-M102 may carry the UE-1 301 SIP 200 OK message to UE-3 309 through the network nodes. UE-1 301 may send M100 to UE-1 P-CSCF 302. UE-1 P-CSCF 302 may send M101 to UE-1 S-CSCF 303, and UE-1 S-CSCF 303 may send M102 to UE-3 S-CSCF 308.

With M103-105, UE-3 309 may send an INVITE request to the CS, e.g., AS/MRFC 304, to join the conference call. The CS may coordinate with MRFP to allocate more resources.

UE-3 309 may send an invite message to AS/MRFC 304 to join the conference call. For example, UE-3 309 may send a SIP INVITE message to AS/MRFC 304. M103-104 may carry the UE-3 309 SIP INVITE message to AS/MRFC 304. UE-3 S-CSCF 308 may send M103 to UE-1 S-CSCF 303, and UE-1 S-CSCF 303 may send M104 to AS/MRFC 304.

With group message M105, the CS may coordinate with MRFP to allocate more resources.

With M106-109, the AS/MRFC 304 may send a 200 OK response to UE-3 309 and receive an ACK request.

AS/MRFC 304 may send a success message to UE-3 309. For example, AS/MRFC 304 may send a SIP 200 OK response to UE-3 309. M106-M107 may carry the AS/MRFC 304 SIP 200 OK message to UE-3 309 through the network nodes. AS/MRFC 304 may send M106 to UE-1 S-CSCF 303. UE-1 S-CSCF 303 may send M107 to UE-3 S-CSCF 308.

UE-3 309 may send an acknowledgment message to AS/MRFC 304. For example, UE-3 309 may send a SIP ACK request message to AS/MRFC 304. M108-109 may carry the UE-3 309 SIP ACK request message to AS/MRFC 304. UE-3 S-CSCF 308 may send M108 to UE-1 S-CSCF 303, and UE-1 S-CSCF 303 may send M109 to AS/MRFC 304.

At 360, a media path between UE-3 309 and MRF 305 is established.

With M110-115, UE-3 309 may send a NOTIFY request to UE-1 301 to indicate that it has finished the action required by the REFER request.

UE-3 309 may send a notification message to UE-1 301. For example, UE-3 309 may send a SIP NOTIFY message to UE-1 301. M110-M112 may carry the UE-3 309 SIP NOTIFY message to UE-1 301 through the network nodes. UE-3 S-CSCF 308 may send M110 to UE-1 S-CSCF 303. UE-1 S-CSCF 303 may send M111 to UE-1 P-CSCF 302, and UE-1 P-CSCF 302 may send M112 to UE-1 301.

UE-1 301 may send a success message to UE-3 309. For example, UE-1 301 may send a SIP 200 OK response to UE-3 309. M113-M115 may carry the UE-1 301 SIP 200 OK message to UE-3 309 through the network nodes. UE-1 301 may send M113 to UE-1 P-CSCF 302. UE-1 P-CSCF 302 may send M114 to UE-1 S-CSCF 303, and UE-1 S-CSCF 303 may send M115 to UE-2 S-CSCF 306.

With M116-118, the CS, e.g., AS/MRFC 304, may send a SIP NOTIFY with the participant list to UE-1 301.

AS/MRFC 304 may send a notification message with the participant list to UE-1 301. For example, AS/MRFC 304 may send a SIP NOTIFY message to UE-1 301. M116-M118 may carry the AS/MRFC 304 SIP NOTIFY message with the participant list to UE-1 301 through the network nodes. AS/MRFC 304 may send M116 to UE-1 S-CSCF 303. UE-1 S-CSCF 303 may send M117 to UE-1 P-CSCF 302, and UE-1 P-CSCF 302 may send M118 to UE-1 301.

With M119-121, UE-1 301 may send a 200 OK response to CS.

UE-1 301 may send a success message to AS/MRFC 304. For example, UE-1 301 may send a SIP 200 OK response to AS/MRFC 304. M119-M121 may carry the UE-1 301 SIP 200 OK response to AS/MRFC 304. UE-1 may send M119 to UE-1 P-CSCF 302. UE-1 P-CSCF 302 may send M120 to UE-1 S-CSCF 303, and UE-1 S-CSCF 303 may send M121 to AS/MRFC 304.

In one embodiment, with signaling M122-124 at 370, after UE-3 309 joins the conference call, UE-2 307 may receive an updated list of participants.

In one embodiment, with M122-123, the CS may send a NOTIFY with the participant list to UE-2 307.

AS/MRFC 304 may send a notification message with the participant list to UE-3 307. For example, AS/MRFC 304 may send a SIP NOTIFY message to UE-2 307. M122-M123 may carry the AS/MRFC 304 SIP NOTIFY message with the participant list to UE-2 307 through the network nodes. AS/MRFC 304 may send M122 to UE-2 S-CSCF 306, and UE-2 S-CSCF 306 may send M123 to UE-2 307.

In one embodiment, with M124-125, the UE-2 307 may send a 200 OK response to the CS.

UE-2 307 may send a success message to AS/MRFC 304. For example, UE-2 307 may send a SIP 200 OK response to AS/MRFC 304. M124-M125 may carry the UE-2 307 SIP 200 OK response to AS/MRFC 304. UE-2 307 may send M124 to UE-2 S-CSCF 306. UE-2 S-CSCF 306 may send M125 to AS/MRFC 304.

In one embodiment, with M126-129, UE-1 301 may send a SIP UPDATE, OPTIONS, or RE-INVITE message with the header "Allow-Event: conference" and XML body containing the conference URI information to UE-3 309.

UE-1 301 may send an update message to UE-3 309. For example, UE-1 301 may send a SIP UPDATE, OPTIONS, or RE-INVITE message with the header "Allow-Event: conference" and XML body containing the conference URI information to UE-3 309. M126-M129 may carry the UE-1 301 SIP UPDATE, OPTIONS, or RE-INVITE message with the header "Allow-Event: conference" and XML body containing the conference URI information to UE-3 309 through the network nodes. UE-1 301 may send M126 to UE-1 P-CSCF 302. UE-1 P-CSCF 302 may send M127 to UE-1 S-CSCF 303. UE-1 S-CSCF 303 may send M128 to UE-3 S-CSCF 308, and UE-3 S-CSCF 308 may send M129 to UE-3 309.

With M130-137, UE-3 309 may send a SIP 200 OK response to UE-1 301 and receive an ACK request.

UE-3 309 may send a success message to UE-1 301. For example, UE-3 309 may send a SIP 200 OK response to UE-1 301. M130-M133 may carry the UE-3 309 SIP 200 OK response to UE-1 301 through the network nodes. UE-3 309 may send M130 to UE-3 S-CSCF 308. UE-3 S-CSCF 308 may send M131 to UE-1 S-CSCF 303. UE-1 S-CSCF 303 may send M132 to UE-1 P-CSCF 302, and UE-1 P-CSCF 302 may send M133 to UE-1 301.

UE-1 301 may send an acknowledgment message to UE-3 309. For example, UE-1 301 may send a SIP ACK request message to UE-3 309. M134-M137 may carry the UE-1 301 SIP ACK request message to UE-3 309 through the network nodes. UE-1 301 may send M134 to UE-1 P-CSCF 302. UE-1 P-CSCF 302 may send M135 to UE-1 S-CSCF 303. UE-1 S-CSCF 303 may send M136 to UE-3 S-CSCF 308, and UE-3 S-CSCF 308 may send M137 to UE-3 309.

In one embodiment, with M138-139, UE-3 309 may subscribe for conference event by sending a SIP SUB-SCRIBE to the CS.

UE-3 309 may send a subscribe message to AS/MRFC 304. For example, UE-2 307 may send a SIP SUBSCRIBE message to UE-1 301. M138-M139 may carry the UE-3 309 SIP SUBSCRIBE message to AS/MRFC 304 through the network nodes. UE-3 309 may send M138 to UE-3 S-CSCF 308, and UE-3 S-CSCF 308 may send M139 to AS/MRFC 304.

In one embodiment, with M140-141, the CS may send a 200 OK response to UE-3 309.

AS/MRFC 304 may send a success message to UE-3 309. For example, AS/MRFC 304 may send a SIP 200 OK response to UE-3 309. M140-M141 may carry the AS/MRFC 304 SIP 200 OK response to UE-3 309 through the network nodes. AS/MRFC 304 may send M140 to UE-3 S-CSCF 308, and UE-3 S-CSCF 308 may send M141 to UE-3 309.

In one embodiment, with M142-143, the CS may send a NOTIFY with participants to UE-3 309.

AS/MRFC 304 may send a notification message with the participant list to UE-3 309. For example, AS/MRFC 304 may send a SIP NOTIFY message with the participant list to UE-3 309. M142-M143 may carry the AS/MRFC 304 SIP NOTIFY message with the participant list to UE-3 309 through the network nodes. AS/MRFC 304 may send M142 to UE-3 S-CSCF 308, and UE-3 S-CSCF 309 may send M143 to UE-3 309.

In one embodiment, with M144-145, UE-3 309 may send a 200 OK response to the CS.

UE-3 309 may send a success message to AS/MRFC 304. For example, UE-3 309 may send a SIP 200 OK response to UE-1 301. M144-M145 may carry the UE-3 309 SIP 200 OK response to AS/MRFC 304 through the network nodes. UE-3 309 may send M144 to UE-2 S-CSCF 306, and UE-2 S-CSCF 306 may send M145 to AS/MRFC 304.

With M146-152, UE-1 may send a BYE request to terminate the multimedia session between itself and UE-3 309.

UE-1 301 may send a termination message to UE-3 309. For example, UE-1 301 may send a SIP BYE request message to UE-3 309. M146-M149 may carry the UE-1 301 SIP BYE request message to UE-3 309 through the network nodes. UE-1 301 may send M146 to UE-1 P-CSCF 302. UE-1 P-CSCF 302 may send M147 to UE-1 S-CSCF 303. UE-1 S-CSCF 303 may send M148 to UE-3 S-CSCF 308, and UE-3 S-CSCF 308 may send M149 to UE-3 309.

UE-3 309 may send a success message to UE-1 301. For example, UE-3 309 may send a SIP 200 OK response to UE-1 301. M150-M153 may carry the UE-3 309 SIP 200 OK response to UE-1 301 through the network nodes. UE-3 309 may send M150 to UE-3 S-CSCF 308. UE-3 S-CSCF 308 may send M151 to UE-1 S-CSCF 303. UE-1 S-CSCF 303 may send M152 to UE-1 P-CSCF 302, and UE-1 P-CSCF 302 may send M153 to UE-1 301.

Figure 4:
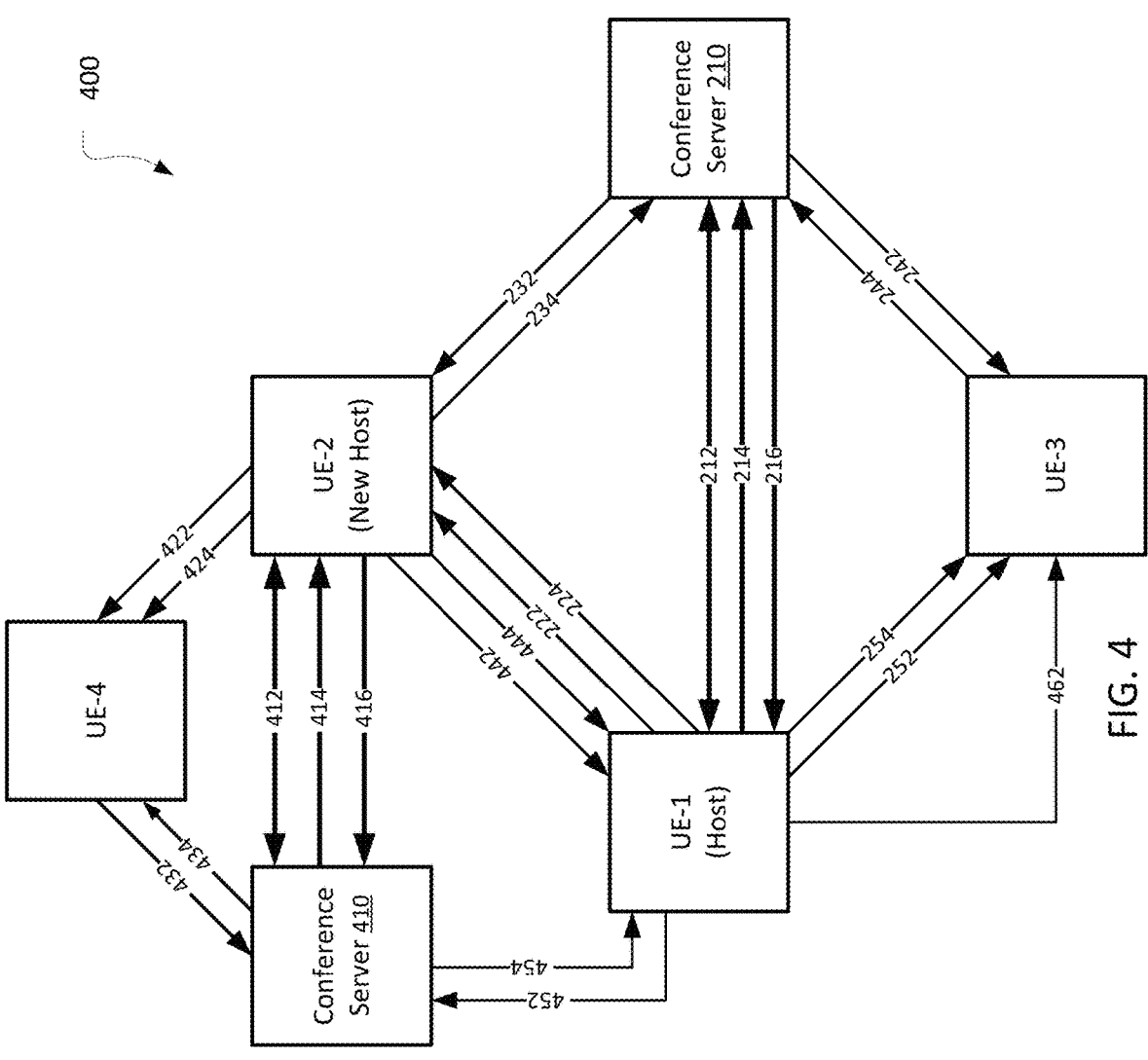
FIG. 4 illustrates a signaling diagram in accordance with some embodiments.

FIG. 4 illustrates a signaling diagram 400 in accordance with some embodiments. Signaling diagram 400 is an example of messages involved in establishing a conference call with privacy controls for four UEs. Consider that UE-1, UE-2, and UE-3 are in a conference call as described in FIG. 2 above, and UE-1 initiates or hosts this conference call. The UE-2 puts the conference call on hold. While the conference call is on hold, UE-2 and UE-4 establish an IMS call, e.g., a multimedia session. UE-2 adds the existing conference call and UE-4 to a new conference call by merging the calls. UE-1, which was the originator of the previously initiated conference call, upon receiving NOTIFY SIP with the participant list from UE-2's conference server, may send OPTIONS SIP with the updated participant list to UE-3.

Consider UE-1, UE-2, and UE-3 in a first conference call as described in FIG. 2. The signalings 212, 214, 216, 222, 224, 232, 234, 242, 244, 252, 254, and the creation and configuration of conference server UE-1 are as described in FIG. 2. UE-2 may put the first conference call on hold and establish a multimedia session with UE-4. UE-2 may create a second conference call by merging the call with UE-4 with the first conference call.

UE-2 may set up a conference call server 410. A collection of signaling 412 between UE-2 and the conference server 410 may set up the conference server 410. For example, UE-2 may use a similar process that UE-1 used for setting up the conference server 210, as described in FIG. 2 above. UE-2 may obtain a URI associated with the conference server 410.

Once the conference call server 410 is established, UE-2 (new host) may add UE-4 and the first conference call to the second conference call.

UE-2 may send a refer message 422 to UE-4 to add UE-4 to the second conference call. For example, UE-2 may send a SIP REFER message to UE-4 to add UE-4 to the conference call. UE-2 (the referrer) may send a REFER to UE-4 requesting to contact the second conference call URI.

UE-2 may subscribe to the second conference event, e.g., the event associated with the second conference call. When subscribed to the conference event, UE-2 may receive event notification. UE-2 may subscribe to the second conference event by sending a subscribe message 414 to the conference server 410. For example, UE-2 may send a SUBSCRIBE method to conference server 410 to subscribe to the confer-ence event. In response to the subscribe message 414, the conference server 410 may send a notification message 416 to UE-2 with information about the conference event. For example, the conference server 410, in response to the SIP SUBSCRIBE method, may send a SIP NOTIFY method to inform UE-2 about the conference event. The SIP NOTIFY method may include participant list information of the second conference call.

In one embodiment, UE-2 may send an update message 424 to UE-4 to provide information about the conference server 410. For example, UE-2 may send SIP UPDATE, SIP OPTIONS, or SIP RE-INVITE to UE-4 to provide the second conference server URI or the second conference event to UE-4. UE-2 may configure UPDATE, OPTION, or RE-INVITE messages with the header "Allow-Events: con-ference" and extensible markup language (XML) body containing the conference URI. UE-4 may send a success message to respond to the update message 424, indicating that the request was successful. For example, UE-4 may send a SIP 200 OK response for SIP UPDATE, OPTION, or RE-INVITE messages. UE-2 may further acknowledge receipt of the success message from UE-4. For example, in response to receiving a SIP 200 OK from UE-4, UE-2 may send a SIP ACK message to UE-4.

Receiving the information of the conference server 410 from UE-2, UE-4 may subscribe to the conference event. When subscribed to the conference event, UE-4 may receive event notification. UE-4 may subscribe to the second con-ference event by sending a subscribe message 434 to the conference server 410. For example, UE-4 may send a SUBSCRIBE method to conference server 410 to subscribe to the second conference event. In response to the subscribe message 434, the conference server 410 may send a notifi-cation message 432 to UE-4 with information about the conference event. For example, the conference server 410, in response to the SIP SUBSCRIBE method, may send a SIP NOTIFY method to inform UE-4 about the conference event. The SIP NOTIFY method may include participant list information.

In one embodiment, UE-2 may add UE-1 to the second conference call. UE-2 may send a refer message 442 to UE-1 to add UE-1 to the second conference call. For example, UE-2 may send a SIP REFER message to UE-1 to add UE-1 to the second conference call. UE-2 (the referrer) may send a REFER to UE-1 requesting to contact the second confer-ence call URI.

In one embodiment, UE-2 may send an update message 444 to UE-1 to provide information about the conference server. For example, UE-2 may send SIP UPDATE, SIP OPTIONS, or SIP RE-INVITE to UE-1 to provide the conference server URI or conference event to UE-1. UE-2 may configure UPDATE, OPTION, or RE-INVITE mes-sages with the header "Allow-Events: conference" and extensible markup language (XML) body containing the conference URI. UE-1 may send a success message to UE-2 to respond to the update message 444, indicating that the request was successful. For example, UE-1 may send a SIP 200 OK response to UE-2 for SIP UPDATE, OPTION, or RE-INVITE messages. UE-2 may further acknowledge receipt of the success message from UE-1. For example, in response to receiving a SIP 200 OK from UE-1, UE-2 may send a SIP ACK message to UE-1.

Receiving the information of the conference server from UE-2, UE-1 may subscribe to the conference event. When subscribed to the conference event, UE-1 may receive event notification. UE-1 may subscribe to the conference event by sending a subscribe message 452 to the conference server 410. For example, UE-1 may send a SUBSCRIBE method to conference server 410 to subscribe to the conference event. In response to the subscribe message 452, the con-ference server 410 may send a notification message 454 to UE-3 with information about the conference event. For example, the conference server 410, in response to the SIP SUBSCRIBE method, may send a SIP NOTIFY method to inform UE-1 about the conference event. The SIP NOTIFY method may include participant list information.

In one embodiment, UE-1 may send an update message 462 to UE-3 with information about the conference event. For example, UE-1 may send a SIP UPDATE, OPTION, or RE-INVITE message to inform UE-3 about the conference event. The SIP UPDATE, OPTION, or RE-INVITE mes-sages may include participant list information.

The order of signaling described above is intended to describe the procedure by way of an example and is not intended to be a limitation.

Figure 5:
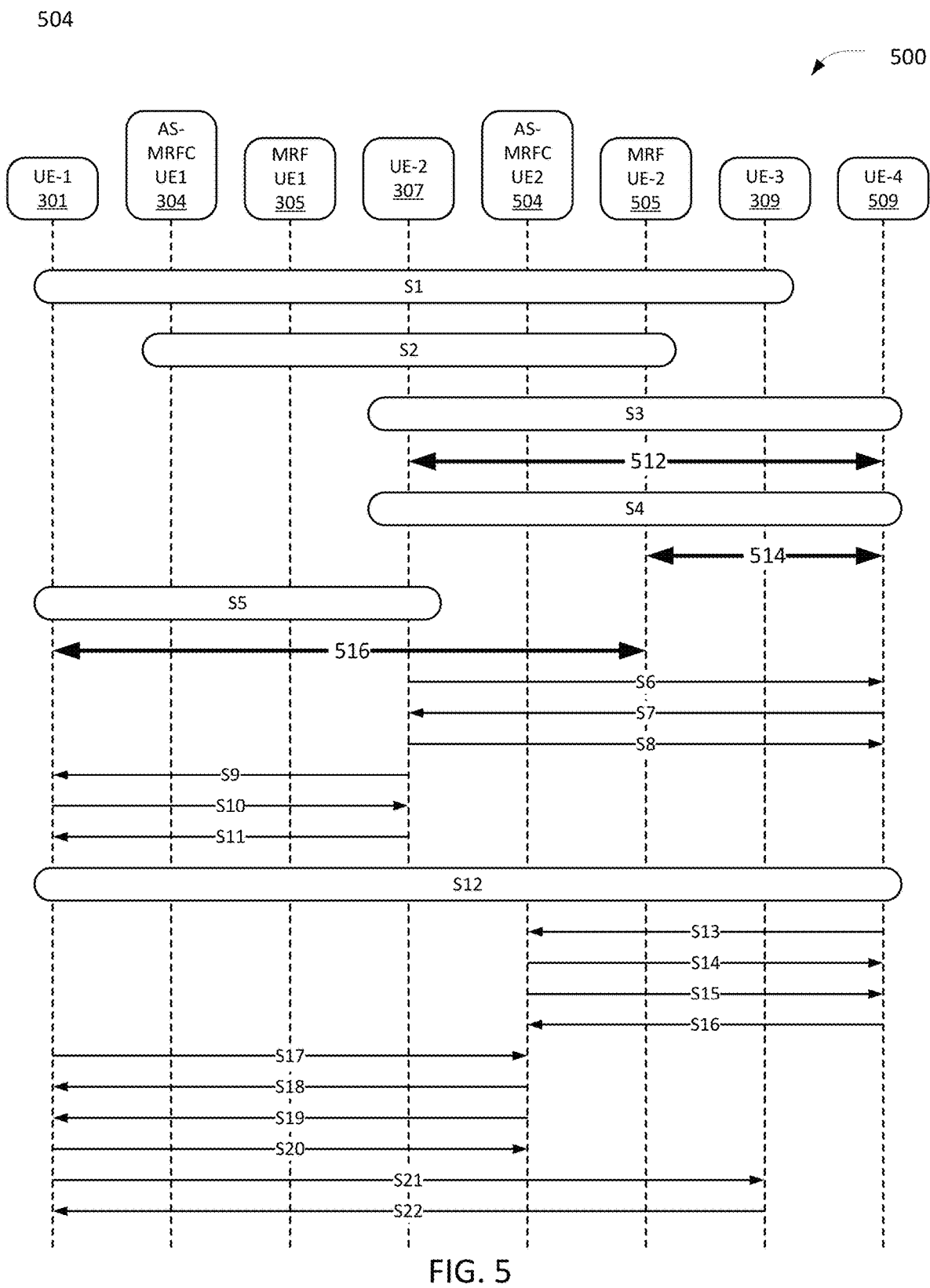
FIG. 5 illustrates a signaling diagram in accordance with some embodiments.

FIG. 5 illustrates a signaling diagram 500 in accordance with some embodiments. Signaling diagram 500 is an example of messages involved in establishing a conference call with privacy controls for four UEs.

The group of messages in S1 may establish the first conference call among UE-1, UE-2, and UE-3 in accordance with the embodiments described above for signaling diagram 300 and FIG. 3.

With the group of messages in S2, UE-2 307 puts the first conference call on hold.

With the group of messages in S3, UE-2 307 establishes a call with UE-4 509 following the normal call setup procedure and gets UE-4's permission to start a second conference call.

At 512, a media path between UE-2 307 and UE-4 509 is established.

With the group of messages in S4, UE-2 307 adds UE-4 509 to the second conference call. M4 may include signaling similar to those associated with 422 messages in FIG. 4. M4 signalings may also include required signaling to set up a conference server for the second conference call, e.g., 412, 414, and 416 signalings in FIG. 4. The conference server associated with the second conference call may include AS/MRFC UE-2 504 or MRF UE-2 505.

Upon completion of S4 messages, at 514, a media path between the conference server associated with the second conference call, e.g., MRF UE-2 505 or AS/MRFC UE-2 504 and UE-4 509, is established.

With the group of messages in S5, UE-2 307 adds UE-1 301 to the second conference call. M4 may include signaling similar to those associated with 422 messages in FIG. 4.

Upon completion of S5 messages, at 516, a media path between the conference server associated with the second conference call, e.g., MRF UE-2 505 or AS/MRFC UE-2 504 and UE-1 301, is established.

In one embodiment, UE-2 may send an update message S6 to UE-4 to provide information about the conference server. For example, UE-2 may send SIP UPDATE, SIP OPTIONS, or SIP RE-INVITE to UE-4 to provide the second conference server URI or the second conference event to UE-4. UE-2 may configure UPDATE, OPTION, or RE-INVITE messages with the header "Allow-Events: conference" and extensible markup language (XML) body containing the conference URI. UE-4 may send a success message S7 to respond to the update message S6, indicating that the request was successful. For example, UE-4 may send a SIP 200 OK response for SIP UPDATE, OPTION, or RE-INVITE messages. UE-2 may further acknowledge receipt of the success message from UE-4 by sending an acknowledgment message S8. For example, in response to receiving a SIP 200 OK from UE-4, UE-2 may send a SIP ACK message to UE-4.

In one embodiment, UE-2 may send an update message S9 to UE-1 to provide information about the conference server. For example, UE-2 may send SIP UPDATE, SIP OPTIONS, or SIP RE-INVITE to UE-1 to provide the conference server URI or conference event to UE-1. UE-2 may configure UPDATE, OPTION, or RE-INVITE messages with the header "Allow-Events: conference" and extensible markup language (XML) body containing the conference URI. UE-1 may send a success message S10 to UE-2 to respond to the update message S9, indicating that the request was successful. For example, UE-1 may send a SIP 200 OK response to UE-2 for SIP UPDATE, OPTION, or RE-INVITE messages. UE-2 may further acknowledge receipt of the success message from UE-1 by sending an acknowledgment message S11. For example, in response to receiving a SIP 200 OK from UE-1, UE-2 may send a SIP ACK message to UE-1.

The group of messages in S12, UE-1 301, UE-2 307, UE-3 309, and UE-4 509 are in a 4-way conference call.

In one embodiment, UE-4 509 may subscribe to the conference event associated with the second conference call. When subscribed to the conference event, UE-4 509 may receive event notification. UE-4 509 may subscribe to the second conference event by sending a subscribe message S13 to the conference server, e.g., AS/MRFC UE-2 504. For example, UE-4 509 may send a SUBSCRIBE method to the conference server to subscribe to the conference event associated with the second conference call. In response to the subscribe message S13, AS/MRFC UE-2 504 may send a success message S14 and a notification message S15 to UE-4 509. The notification message S15 may include information about the conference event associated with the second conference call.

For example, the S15 message may be a SIP NOTIFY method to inform UE-4 about the conference event associated with the second conference call. The SIP NOTIFY method may include participant list information associated with the second conference call. The S14 message may be a SIP 200 OK response.

UE-4 509 may send a success message S16 in response to notification message S15. For example, the S16 message may be a SIP 200 OK response.

In one embodiment, UE-1 301 may subscribe to the conference event associated with the second conference call. When subscribed to the conference event, UE-1 301 may receive event notification. UE-1 301 may subscribe to the second conference event by sending a subscribe message S17 to the conference server, e.g., AS/MRFC UE-2 504. For example, UE-1 301 may send a SUBSCRIBE method to the conference server to subscribe to the conference event associated with the second conference call. In response to the subscribe message S17, AS/MRFC UE-2 504 may send a success message S18 and a notification message S19 to UE-1 301. The notification message S19 may include information about the conference event associated with the second conference call.

For example, S19 message may be a SIP NOTIFY method to inform UE-1 301 about the conference event associated with the second conference call. The SIP NOTIFY method may include participant list information associated with the second conference call. The S18 message may be a SIP 200 OK response.

UE-1 301 may send a success message S20 in response to notification message S19. For example, the S20 message may be a SIP 200 OK response.

In one embodiment, UE-1 301 may send an update message S21 to UE-1 to provide information about the conference server. For example, UE-1 301 may send SIP UPDATE, SIP OPTIONS, or SIP RE-INVITE to UE-3 309 to provide the participant list of the second conference call, UE-3 309. UE-3 309 may send a success message S22 to UE-1 301 to respond to the update message S21, indicating that the request was successful. For example, UE-3 309 may send a SIP 200 OK response to UE-1 301 for SIP UPDATE, OPTION, or RE-INVITE messages.

FIG. 6 illustrates signaling messages 600 in accordance with some embodiments. Signaling messages 600 are examples of messages involved in establishing a conference call with privacy controls.

The UPDATE SIP 610 message may include the header Allow-Events with a value set to "conference." The UPDATE SIP 610 message may include "Conference Factory URI" in its XML body. The "Conference Factory URI" may be associated with a conference call.

The OPTIONS SIP 620 message may include the header Allow-Events with a value set to "conference." The UPDATE SIP 620 message may include "Conference Factory URI" in its XML body. The "Conference Factory URI" may be associated with a conference call.

The RE-INVITE SIP 630 message may include the header Allow-Events with a value set to "conference." The UPDATE SIP 630 message may include "Conference Factory URI" in its XML body. The "Conference Factory URI" may be associated with a conference call.

FIG. 7 illustrates an operational flow/algorithmic structure 700 in accordance with some embodiments. Operational flow/algorithmic structure 700 is an example of operating a UE to establish a conference call with privacy controls. The operational flow/algorithmic structure 700 may be implemented by an initiator or a host UE, for example, the UE 104, the UE 1000, or components therein, e.g., processors 1004.

The operational flow/algorithmic structure 700 may include, at 704, establishing a multimedia session with a second UE, UE-2. The second UE may be a non-initiator UE to be added to a conference call by the initiator or host UE.

The operational flow/algorithmic structure 700 may include, at 706, putting the second UE on hold. Putting the second UE on hold may include sending a SIP message to the second UE, causing the second UE to transition to a hold state. In the context of an IMS call, a hold state is a state at which a currently active conversation or multimedia session is suspended.

The operational flow/algorithmic structure 700 may include, at 708, establishing a multimedia session with a third UE, UE-3. The first UE that establishes the multimedia session with the third UE may receive permission from the third UE to start a conference call.

The operational flow/algorithmic structure 700 may include, at 710, establishing a conference call merging multimedia sessions with the second and the third UEs. The conference call may be associated with an IMS server.

The operational flow/algorithmic structure 700 may include, at 712, sending information about the conference call to the second UE and the third UE. In particular, the first UE may send a SIP message to the second or the third UE, including information associated with the conference call. The SIP message may be an UPDATE, OPTIONS, or INVITE message. The information associated with the conference call may include the conference call URI in the XML body of the SIP message or the Allow-Event header, which has a value associated with the conference call.

FIG. 8 illustrates an operational flow/algorithmic structure 800 in accordance with some embodiments. Operational flow/algorithmic structure 800 is an example of operating a UE to establish a conference call with privacy controls. The operational flow/algorithmic structure 800 may be implemented by a non-initiator UE, for example, the UE 104, the UE 1000, or components therein, e.g., processors 1004.

The operational flow/algorithmic structure 800 may include, at 804, establishing a multimedia session with a second UE. The second UE may be the host UE or the initiator UE for a conference call.

The operational flow/algorithmic structure 800 may include, at 806, receiving a message from the second UE, putting the non-initiator first UE on hold.

The operational flow/algorithmic structure 800 may include, at 808, receiving a conference call from the second UE. The first UE may receive an SIP message, e.g., a SIP REFER message from the second UE, which will add the UE to the conference call.

The operational flow/algorithmic structure 800 may include, at 810, receiving information about the conference call from the second UE. In particular, the first UE may receive a SIP message from the second UE, including information associated with the conference call. The SIP message may be an UPDATE, OPTIONS, or INVITE message. The information associated with the conference call may include the conference call URI in the XML body of the SIP message or the Allow-Event header, which has a value associated with the conference call.

Figure 9:
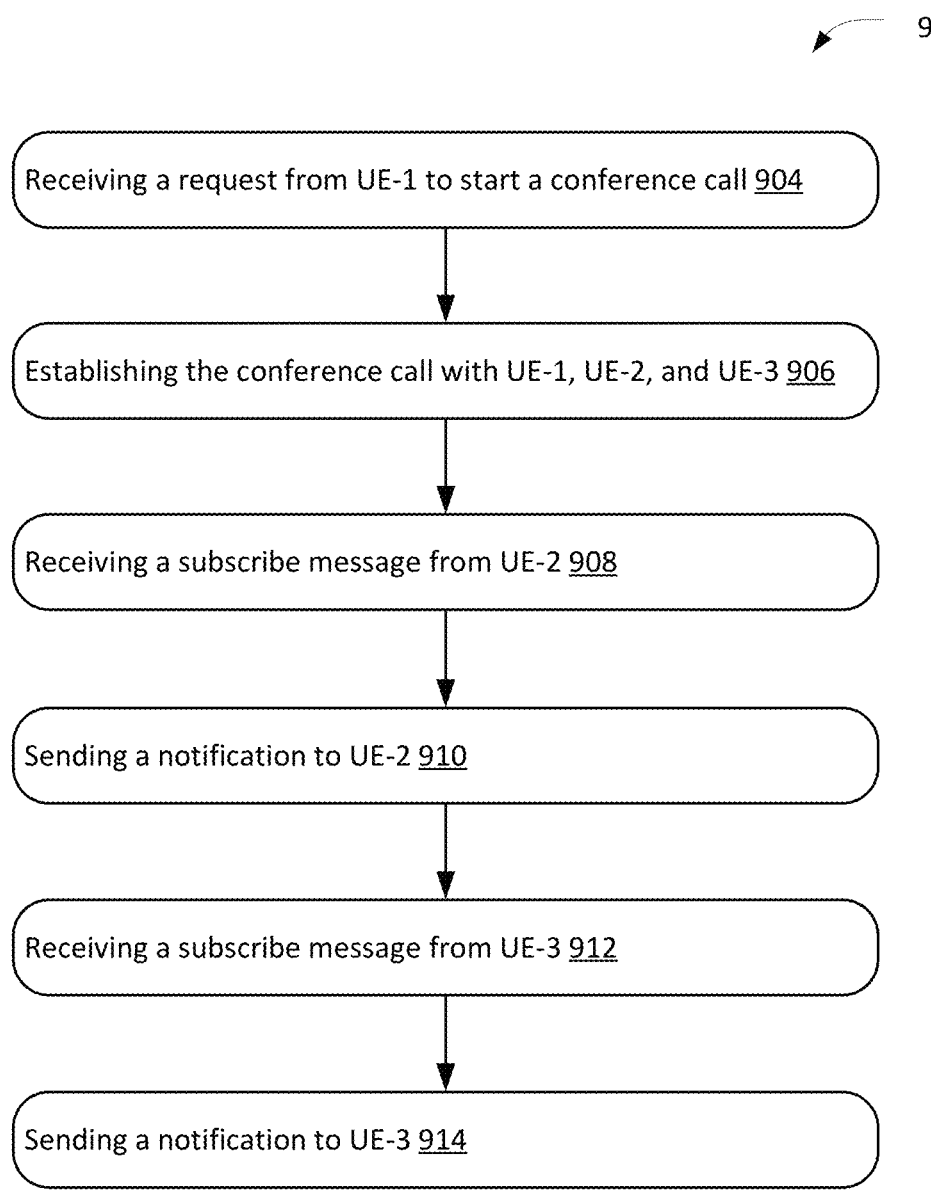
FIG. 9 illustrates an operational flow/algorithmic structure in accordance with some embodiments.

FIG. 9 illustrates an operational flow/algorithmic structure 900 in accordance with some embodiments. Operational flow/algorithmic structure 900 is an example of operating an IMS conference server (IMS CS) to provide conference calls with privacy controls. The operational flow/algorithmic structure 900 may be implemented by a network node, for example, the AN 108, the network node 1100, or components therein, e.g., processors 1104.

The operational flow/algorithmic structure 900 may include, at 904, receiving a request from an initiator first UE to start a conference call. For example, the IMS CS may receive a SIP INVITE request from the first UE to establish a conference session.

The operational flow/algorithmic structure 900 may include, at 906, establishing the conference call with the first, a second, and a third UE. Establishing the conference call with the second and third UE may include receiving a SIP INVITE message requesting to join the conference call. The IMS CS may coordinate with MRFP associated with the conference call to allocate resources and respond to the second and third UE with a SIP 200 OK response indicating successfully adding them to the conference call.

The operational flow/algorithmic structure 900 may include, at 908, receiving a subscribe message from the second UE. The IMS CS may receive a SIP SUBSCRIBE message from the second UE.

The operational flow/algorithmic structure 900 may include, at 910, sending a notification to the second UE based on the subscribe message from the second UE. The IMS CS may send a SIP NOTIFY with the participant list to the second UE.

The operational flow/algorithmic structure 900 may include, at 912, receiving a subscribe message from the third UE. The IMS CS may receive a SIP SUBSCRIBE message from the third UE.

The operational flow/algorithmic structure 900 may include, at 914, sending a notification to the third UE based on the subscribe message from the second UE. The IMS CS may send a SIP NOTIFY with the participant list to the third UE.

Figure 10:
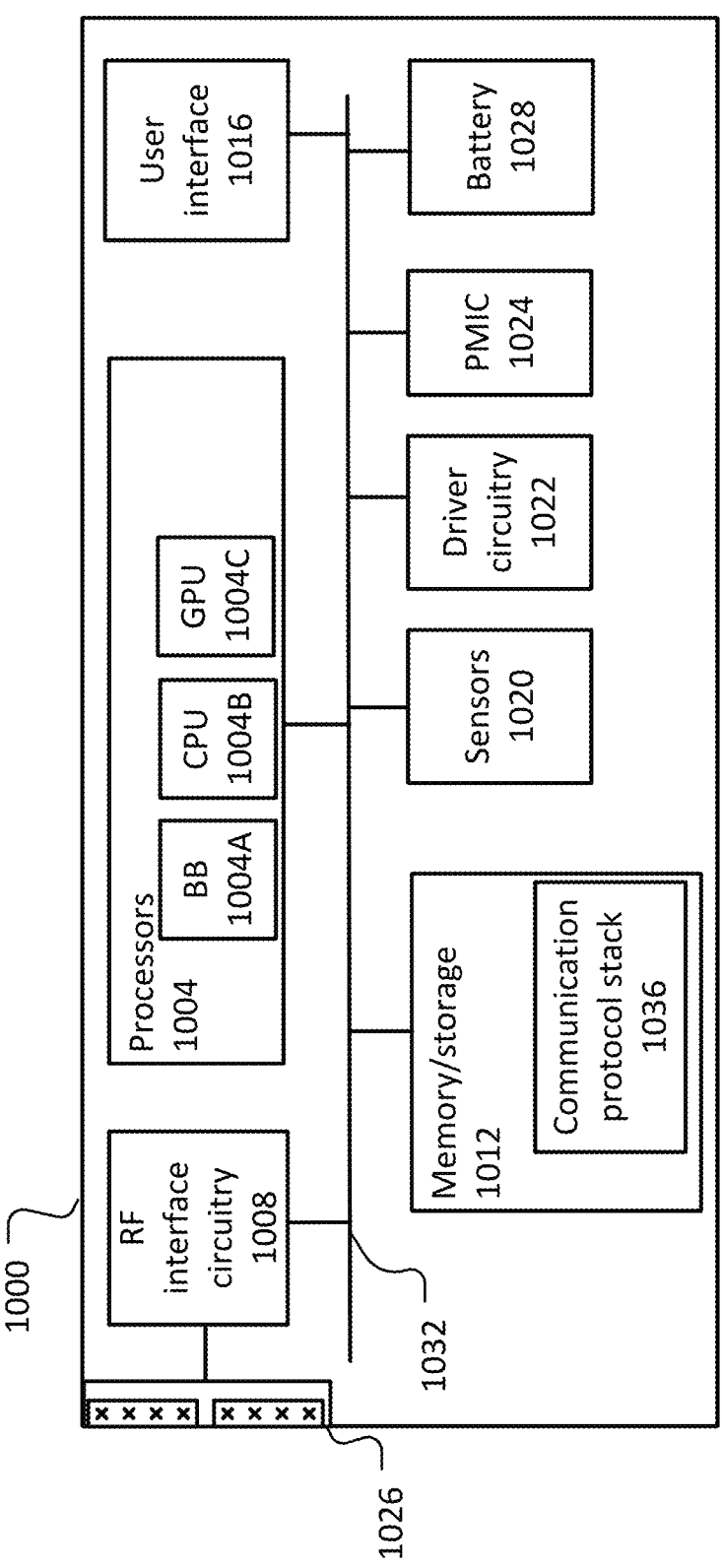
FIG. 10 illustrates a user equipment in accordance with some embodiments.

FIG. 10 illustrates a UE 1000 in accordance with some embodiments. The UE 1000 may be similar to and substantially interchangeable with UE 104 of FIG. 1.

The UE 1000 may be any mobile or non-mobile computing device, such as, for example, a mobile phone, computer, tablet, XR device, glasses, industrial wireless sensor (for example, microphone, carbon dioxide sensor, pressure sensor, humidity sensor, thermometer, motion sensor, accelerometer, laser scanner, fluid level sensor, inventory sensor, electric voltage/current meter, or actuator), video surveillance/monitoring device (for example, camera or video camera), wearable device (for example, a smartwatch), or Internet-of-things device.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangements of the components shown may occur in other implementations.

The components of the UE 1000 may be coupled with various other components over one or more interconnects 1032, which may represent any type of interface, input/ output, bus (local, system, or expansion), transmission line, trace, or optical connection that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

The processors 1004 may perform operations associated with bearer flows as described elsewhere herein. For example, the processors 1004 may send to or receive from another UE a SIP UPDATE, OPTIONS, or RE-INVITE with a conference call information, e.g., conference call URI in the XML body to establish a conference call with privacy control consistent with embodiments described herein.

In some embodiments, the baseband processor circuitry 1004A may access a communication protocol stack 1036 in the memory/storage 1012 to communicate over a 3GPP-compatible network. In general, the baseband processor circuitry 1004A may access the communication protocol stack 1036 to: perform user plane functions at a PHY layer, MAC layer, RLC sublayer, PDCP sublayer, SDAP sublayer, and upper layer; and perform control plane functions at a PHY layer, MAC layer, RLC sublayer, PDCP sublayer, RRC layer, and a NAS layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based on the cyclic prefix OFDM (CP-OFDM) in the uplink or downlink and discrete Fourier transform spread OFDM (DFT-S-OFDM) in the uplink.

The memory/storage 1012 may include one or more non-transitory, computer-readable media that include instructions (for example, the communication protocol stack 1036) that may be executed by one or more of the processors 1004 to cause the UE 1000 to perform various operations described herein. The memory/storage 1012 includes any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), erasable programmable read-only memory (EPROM), electrically erasable programmable read-only memory (EEPROM), Flash memory, solid-state memory, or any other type of memory device technology.

The RF interface circuitry 1008 may include transceiver circuitry and a radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processor 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, or phased array antennas. The antenna 1026 may have one or more panels designed for specific frequency bands, including bands in FR1 or FR2.

The user interface circuitry 1016 includes various input/ output (I/O) devices designed to enable user interaction with the UE 1000. The user interface 1016 includes input device circuitry and output device circuitry. Input device circuitry includes any physical or virtual means for accepting an input, including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual displays, including, inter alia, one or more simple visual outputs/indicators (for example, binary status indicators such as light emitting diodes (LEDs) and multi-character visual outputs or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various I/O devices that may be present within or connected to the UE 1000. For example, the driver circuitry 1022 may include circuitry to facilitate the coupling of a universal integrated circuit card (UICC) or a universal subscriber identity module (USIM) to the UE 1000. For additional examples, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage the power provided to various components of the UE 1000. In particular, with respect to the processors 1004, the PMIC 1024 may control power-source selection, voltage scaling, battery charging, or DC-to-DC conversion.

In some embodiments, the PMIC 1024 may control or otherwise be part of various power-saving mechanisms of the UE 1000, including DRX, as discussed herein.

A battery 1028 may power the UE 1000, although in some examples, the UE 1000 may be mounted and deployed in a fixed location and may have a power supply coupled to an electrical grid. The battery 1028 may be a lithium-ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Figure 11:
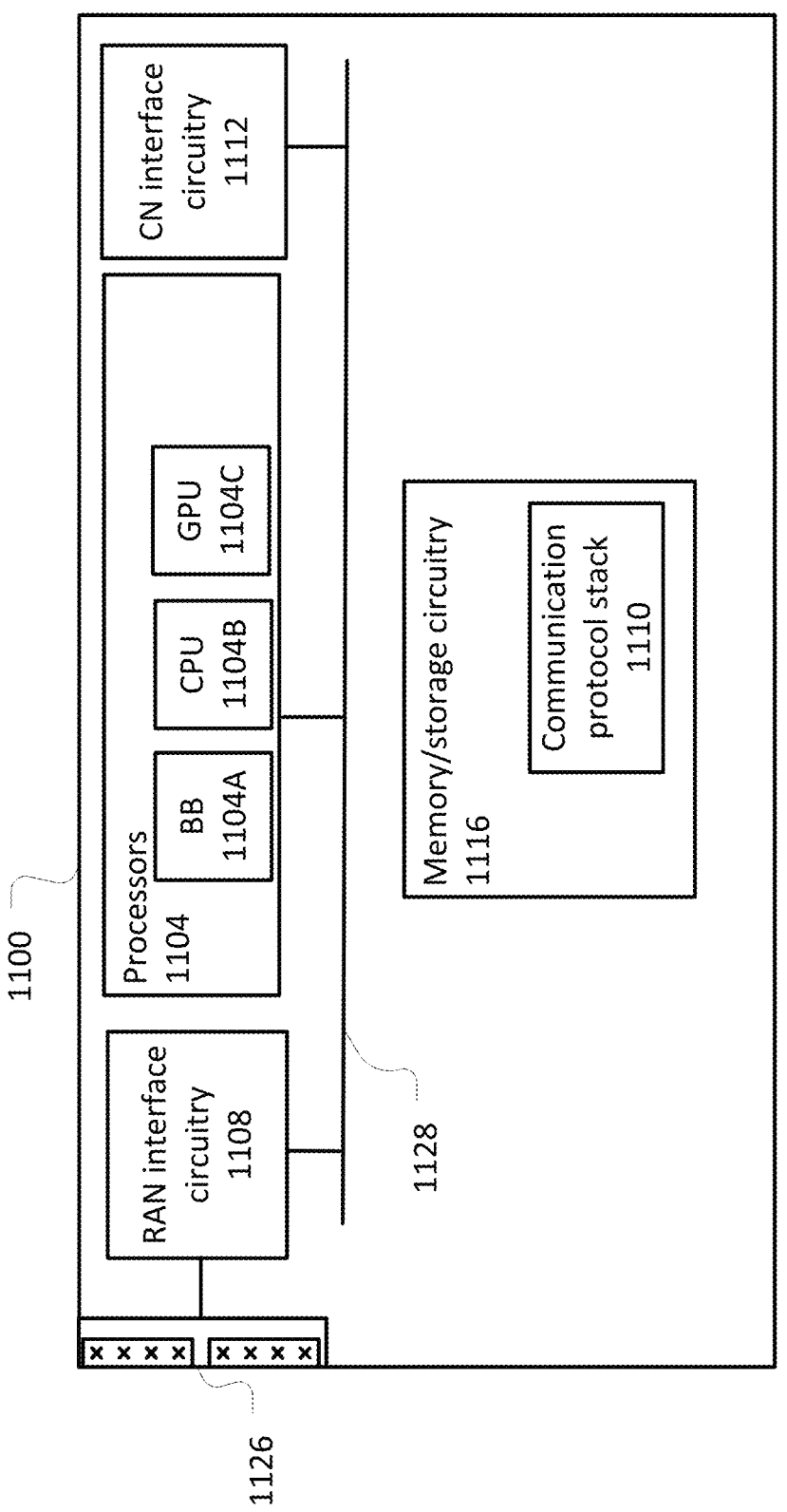
FIG. 11 illustrates a network node in accordance with some embodiments.

FIG. 11 illustrates a network node 1100 in accordance with some embodiments. The network node 1100 may be similar to and substantially interchangeable with base station 108, a device implementing one of the network hops, an integrated access and backhaul (IAB) node, a network-controlled repeater, or a server in a core network or external data network.

The network node 1100 may include processors 1104, RF interface circuitry 1108 (if implemented as an access node), the core node (CN) interface circuitry 1112, memory/storage circuitry 1116, and antenna structure 1126.

The components of the network node 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 10.

The processors 1104 may perform operations associated with bearer flows as described elsewhere herein. For example, the processors 1104 may receive SIP SUBSCRIBE message from non-initiator UEs to subscribe to a conference call and sending a SIP NOTIFY message with a participant list to the non-initiator UEs of a conference call to establish a conference call with privacy control consistent with embodiments described herein.

The CN interface circuitry 1112 may provide connectivity to a core network, for example, a 5th Generation Core network (5GC) using a 5GC-compatible network interface protocol such as carrier Ethernet protocols or some other suitable protocol. Network connectivity may be provided to/from the network node 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

In some embodiments, the network node 1100 may be coupled with transmit-receive points (TRPs) using the antenna structure 1126, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc., as described above in connection with one or more of the preceding figures, may be configured to operate in accordance with one or more of the examples set forth below in the example section.

EXAMPLES

In the following sections, further exemplary aspects are provided.

Example 1 includes a method of operating a first user equipment (UE), the method including: establishing a first multimedia session with a second UE; sending a first session initiation protocol (SIP) message to transition the second UE to a hold state; establishing a second multimedia session with a third UE; establishing a conference call with an Internet protocol multimedia subsystem (IMS) server associated with the first UE to merge the first multimedia session and the second multimedia session; and sending a second SIP message to the second UE or the third UE, the second SIP message to include information associated with the conference call.

Example 2 includes the method of example 1 or some other examples herein, wherein the second SIP message is an UPDATE message, an OPTIONS message, or a RE-INVITE message.

Example 3 includes the method of examples 1 or 2 or some other examples herein, wherein information associated with the conference call is included in an Allow-Event header of the second SIP message.

Example 4 includes the method of any of examples 1-3 or some other examples herein, wherein information associated with the conference call includes a uniform resource identifier (URI) associated with the conference call.

Example 5 includes the method of any of examples 1-4 or some other examples herein, wherein the URI is included in an extensible markup language (XML) body of the second SIP message.

Example 6 includes the method of any of examples 1-5 or some other examples herein, further including: receiving, from the second UE, a SIP response code to indicate a successful reception of the second SIP method.

Example 7 includes the method of any of examples 1-6 or some other examples herein, wherein the SIP response is a 200 OK response.

Example 8 includes the method of any of examples 1-7 or some other examples herein, further including: sending, to the second UE, a request to terminate the first multimedia session.

Example 9 includes the method of any of examples 1-8 or some other examples herein, wherein the request is a SIP BYE request.

Example 10 includes a method of operating a first user equipment (UE), the method including: establishing a multimedia session with a second UE; receiving, from the second UE, a first session initiation protocol (SIP) message to transition the first UE to a hold state; receiving, from the second UE, a second SIP message to add the first UE to a conference call, the conference call different from the multimedia session and associated with an Internet protocol multimedia subsystem (IMS) server associated with the second UE; and receiving, from the second UE, a third SIP message including information associated with the conference call.

Example 11 includes a method of example 10 or any other examples herein, wherein the second SIP message is an UPDATE message, an OPTIONS message, or a RE-INVITE message.

Example 12 includes a method of examples 10 or 11 or any other examples herein, wherein the second SIP message is to include an Allow-Event header.

Example 13 includes a method of any of the examples 10-12 or any other examples herein, wherein the information is to include a uniform resource identifier (URI) associated with the conference call.

Example 14 includes a method of any of the examples 10-13 or any other examples herein, wherein the conference call is a first conference call, the IMS server is a first IMS server, and the second UE is in a second conference call with the first UE and a third UE, the second conference call associated with a second IMS server associated with the first UE, and the method further includes: sending a message to the third UE to update a list of participants.

Example 15 includes a method of any of the examples 10-14 or any other examples herein, further including: sending, to the IMS server, a third SIP message to subscribe to a conference event associated with the conference call based on the second SIP message; and receiving, from the IMS server, a notification associated with the third SIP message.

Example 16 includes a method of any of the examples 10-15 or any other examples herein, wherein the notification is to include an indication of a list of participants associated with the conference call.

Example 17 includes a method of any of the examples 10-16 or any other examples herein, wherein the notification is a SIP NOTIFY message.

Example 18 includes a method of any of the examples 10-17 or any other examples herein, wherein the third SIP message is a SIP SUBSCRIBE message including an Event header.

Example 19 includes a method of operating an Internet protocol multimedia subsystem (IMS) server, the method including: receiving, from a first user equipment (UE), a request to establish a conference call; establishing the conference call including the first UE, a second UE and a third UE; receiving, from the second UE, a first subscribe message to subscribe the second UE to a conference event associated with the conference call; sending, to the second UE, a first notification based on the first subscribe message; receiving, from the third UE, a second subscribe message to subscribe the third UE to the conference event associated with the conference call; and sending, to the third UE, a second notification based on the second subscribe message.

Example 20 includes a method of example 19 or any other examples herein, wherein the first or second notification is a session initiation protocol (SIP) NOTIFY message including a list of participants in the conference call.

Example 21 includes a method of examples 19 or 20 or any other examples herein, wherein first subscribe message or the second subscribe message is a session initiation protocol (SIP) SUBSCRIBE message.

Another example may include an apparatus comprising logic, modules, or circuitry to perform one or more elements of a method described in or related to any of examples 1-21 or any other method or process described herein.

Another example may include a method, technique, or process as described in or related to any of examples 1-21 or portions or parts thereof.

Another example may include an apparatus comprising: one or more processors and one or more computer-readable media comprising instructions that, when executed by the one or more processors, cause the one or more processors to perform the method, techniques, or process as described in or related to any of examples 1-21, or portions thereof.

Another example includes a signal as described in or related to any of examples 1-21 or portions or parts thereof.

Another example may include a datagram, information element, packet, frame, segment, PDU, or message as described in or related to any of examples 1-21, or portions or parts thereof, or otherwise described in the present disclosure.

Another example may include a signal encoded with data as described in or related to any of examples 1-21, or portions or parts thereof, or otherwise described in the present disclosure.

Another example may include a signal encoded with a datagram, IE, packet, frame, segment, PDU, or message as described in or related to any of examples 1-21, or portions or parts thereof, or otherwise described in the present disclosure.

Another example may include an electromagnetic signal carrying computer-readable instructions, wherein execution of the computer-readable instructions by one or more processors is to cause the one or more processors to perform the method, techniques, or process as described in or related to any of examples 1-21, or portions thereof.

Another example may include a computer program comprising instructions, wherein execution of the program by a processing element is to cause the processing element to carry out the method, techniques, or process as described in or related to any of examples 1-21, or portions thereof.

Another example may include a signal in a wireless network as shown and described herein.

Another example may include a method of communicating in a wireless network, as shown and described herein.

Another example may include a system for providing wireless communication, as shown and described herein.

Another example may include a device for providing wireless communication, as shown and described herein.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed. Modifications and variations are possible in light of the above teachings or may be acquired from the practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
establishing, by a first user equipment (UE), a multimedia session with a second UE;
processing a first session initiation protocol (SIP) message to transition the first UE to a hold state, the first SIP message received from the second UE;
processing a second SIP message received from the second UE, the second SIP message is to add the first UE to a conference call, the conference call different from the multimedia session and associated with an Internet protocol multimedia subsystem (IMS) server associated with the second UE;
processing a third SIP message received from the second UE, the third SIP message including information associated with the conference call;
generating a fourth SIP message to be sent to the IMS server, wherein the fourth SIP message is to subscribe to a conference event associated with the conference call based on the information in the third SIP message; and
processing a notification received from the IMS server based on the fourth SIP message, wherein the notification includes an indication of a list of participants associated with the conference call.

2. The method of claim 1, wherein the third SIP message is an UPDATE message, an OPTIONS message, or a RE-INVITE message.

3. The method of claim 1, wherein the information is to include a uniform resource identifier (URI) associated with the conference call.

4. The method of claim 1, wherein the conference call is a first conference call, the IMS server is a first IMS server, and the second UE is in a second conference call with the first UE and a third UE, the second conference call associated with a second IMS server associated with the first UE, and the method further comprises:
generating a message to the third UE to update a list of participants.

5. The method of claim 1, wherein the fourth SIP message is a SIP SUBSCRIBE message and the notification is a SIP NOTIFY message.

6. An apparatus comprising:
processing circuitry to:
establish, by a first user equipment (UE), a multimedia session with a second UE;
process a first session initiation protocol (SIP) message to transition the first UE to a hold state, the first SIP message received from the second UE;
process a second SIP message received from the second UE, the second SIP message is to add the first UE to a conference call, the conference call different from the multimedia session and associated with an Internet protocol multimedia subsystem (IMS) server associated with the second UE; and
process a third SIP message received from the second UE, the third SIP message including information associated with the conference call;
generate a fourth SIP message to be sent to the IMS server, the fourth SIP message is to subscribe to a conference event associated with the conference call based on the information in the third SIP message; and
process a notification associated with the subscription, the notification received from the IMS server, wherein the notification is to include an indication of a list of participants associated with the conference call; and
interface circuitry coupled with the processing circuitry, the interface circuitry to communicatively couple the processing circuitry with a component.

7. The apparatus of claim 6, wherein the third SIP message is an UPDATE message, an OPTIONS message, or a RE-INVITE message.

8. The apparatus of claim 6, wherein the information is to include a uniform resource identifier (URI) associated with the conference call.

9. The apparatus of claim 6, wherein the conference call is a first conference call, the IMS server is a first IMS server, and the second UE is in a second conference call with the first UE and a third UE, the second conference call associated with a second IMS server associated with the first UE, and the processing circuitry further to:
generate a message to the third UE to update a list of participants.

10. The apparatus of claim 6, wherein the fourth SIP message is a SIP SUBSCRIBE message and the notification is a SIP NOTIFY message.

11. One or more non-transitory computer-readable media having instructions that, when executed, cause a processing circuitry to:
establish a multimedia session between a first user equipment (UE) and a second UE;
process a first session initiation protocol (SIP) message received from the second UE, the first SIP message to transition the first UE to a hold state;
process a conference call received from the second UE, the conference call associated with an Internet protocol multimedia subsystem (IMS) server associated with the second UE; and

process a second SIP message received from the second UE, the second SIP including information associated with the conference call;

generate a third SIP message to be sent to the IMS server, the third SIP message is to subscribe to a conference event associated with the conference call based on the second SIP message; and process a notification received from the IMS server based on the third SIP message, wherein the notification is to include an indication of a list of participants associated with the conference call.

12. The one or more non-transitory computer-readable media of claim 11, wherein the second SIP message is an UPDATE message, an OPTIONS message, or a RE-INVITE message.

13. The one or more non-transitory computer-readable media of claim 11, wherein the information is to include a uniform resource identifier (URI) associated with the conference call.

14. The one or more non-transitory computer-readable media of claim 11, wherein the conference call is a first conference call, the IMS server is a first IMS server, and the second UE is in a second conference call with the first UE and a third UE, the second conference call associated with a second IMS server associated with the first UE, and the instructions, when executed, further cause the processing circuitry to:

generate a message to be sent to the third UE, the message to update a list of participants.

15. The one or more non-transitory computer-readable media of claim 11, wherein the third SIP message is a SIP SUBSCRIBE message, and the notification is a SIP NOTIFY message.

16. The one or more non-transitory computer-readable media of claim 11, wherein the notification is a SIP NOTIFY message.

* * * * *